US010924560B2

(12) United States Patent
Bullock

(10) Patent No.: US 10,924,560 B2
(45) Date of Patent: Feb. 16, 2021

(54) DETERMINING GEOGRAPHIC LOCATIONS OF NETWORK DEVICES

(71) Applicant: Facebook, Inc., Menlo Park, CA (US)

(72) Inventor: William Bullock, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/049,712

(22) Filed: Jul. 30, 2018

(65) Prior Publication Data
US 2020/0036802 A1 Jan. 30, 2020

(51) Int. Cl.
| | | |
|---|---|---|
| *H04L 29/08* | (2006.01) | |
| *G06N 20/00* | (2019.01) | |
| *G06F 16/9537* | (2019.01) | |
| *G06F 16/29* | (2019.01) | |
| *H04L 29/12* | (2006.01) | |
| *H04L 12/58* | (2006.01) | |
| *G06F 16/487* | (2019.01) | |
| *H04W 4/029* | (2018.01) | |

(52) U.S. Cl.
CPC .............. *H04L 67/18* (2013.01); *G06F 16/29* (2019.01); *G06F 16/9537* (2019.01); *G06N 20/00* (2019.01); *H04L 51/20* (2013.01); *H04L 51/32* (2013.01); *H04L 61/609* (2013.01); *G06F 16/487* (2019.01); *H04W 4/029* (2018.02)

(58) Field of Classification Search
CPC ........ H04L 51/20; H04L 51/32; H04W 4/029; G06F 16/487
See application file for complete search history.

(56) References Cited

U.S. PATENT DOCUMENTS

| | | | | |
|---|---|---|---|---|
| 7,937,336 | B1 * | 5/2011 | Maynard-Zhang | ..... H04L 67/18 706/12 |
| 8,719,346 | B2 * | 5/2014 | Stremel | .................. G06Q 50/01 709/204 |
| 8,914,393 | B2 * | 12/2014 | Sankar | ................ G06F 16/9537 707/758 |

(Continued)

OTHER PUBLICATIONS

International International Search Report and Written Opinion for International Application No. PCT/US2019/043902, dated Oct. 18, 2019.

*Primary Examiner* — Lashonda T Jacobs
(74) *Attorney, Agent, or Firm* — Baker Botts L.L.P.

(57) ABSTRACT

In one embodiment, a method includes receiving one or more communication network addresses and one or more geographic locations of each network address, determining one or more location-related features based on each network address, generating one or more predicted locations of the network address, each predicted location corresponding to one of the first geographic locations of the network address, and each predicted location being associated with a time stamp representing an age of the predicted location, determining, based on the location-related features and the time stamps, a weighting factor representing a probability that at least one of the predicted locations of the network address corresponds to a true location of the network address, and determining, for each of the predicted locations, a weight based on at least the weighting factor, wherein the weight represents a probability that the predicted location corresponds to the true location of the network address.

20 Claims, 12 Drawing Sheets

(56) References Cited

U.S. PATENT DOCUMENTS

| | | | | |
|---|---|---|---|---|
| 8,972,570 B1* | 3/2015 | Moreels | ............... | H05K 999/99 709/224 |
| 9,388,125 B2* | 7/2016 | Purohit | ................. | A61K 51/04 |
| 9,762,689 B2* | 9/2017 | Moreels | ............. | G06Q 30/0261 |
| 10,298,704 B2* | 5/2019 | Nandi | ................. | H04L 67/18 |
| 10,305,854 B2* | 5/2019 | Alizadeh-Shabdiz | ....................... H04L 67/30 |
| 2007/0281716 A1* | 12/2007 | Altman | ................. | H04L 67/18 455/466 |
| 2008/0132243 A1* | 6/2008 | Spalink | ............... | G09B 29/106 455/456.1 |
| 2009/0005076 A1* | 1/2009 | Forstall | .................. | H04L 67/18 455/456.2 |
| 2011/0047182 A1* | 2/2011 | Shepherd | .............. | G06Q 50/01 707/780 |
| 2014/0171106 A1* | 6/2014 | Cheng | .................... | G01S 5/021 455/456.1 |
| 2014/0330765 A1* | 11/2014 | Prieditis | ................... | G06N 5/04 706/58 |
| 2015/0032739 A1* | 1/2015 | Harris | ..................... | G06F 16/29 707/724 |
| 2015/0312721 A1* | 10/2015 | Singh | ..................... | H04L 67/18 455/456.1 |
| 2016/0006628 A1* | 1/2016 | Herring | ............... | H04L 41/0618 709/224 |
| 2016/0044127 A1* | 2/2016 | Filner | ................ | H04L 67/2847 709/213 |
| 2016/0088429 A1* | 3/2016 | Gao | ...................... | G01S 5/0045 455/456.1 |
| 2016/0295372 A1* | 10/2016 | Kapicioglu | ........... | H04W 4/021 |
| 2016/0366551 A1* | 12/2016 | Alsina | .................. | H04W 4/025 |
| 2016/0378774 A1* | 12/2016 | Apreleva | ................ | H04L 51/32 707/737 |
| 2016/0381154 A1* | 12/2016 | Apreleva | ................ | H04L 67/18 709/205 |
| 2017/0310776 A1* | 10/2017 | Moreels | .................. | H04L 67/22 |
| 2017/0339162 A1* | 11/2017 | Singh | .................... | G06Q 50/01 |
| 2017/0359695 A1* | 12/2017 | Aerts | .................... | H04W 64/00 |
| 2018/0165708 A1* | 6/2018 | Bajaj | .................. | G06Q 30/0277 |
| 2019/0007503 A1* | 1/2019 | Zmijewski | .......... | H04L 43/0864 |
| 2019/0080354 A1* | 3/2019 | Booker | .................. | G06Q 50/01 |
| 2019/0245936 A1* | 8/2019 | Nandi | ................ | H04L 61/2007 |
| 2020/0118031 A1* | 4/2020 | Reese | .................... | G06N 20/00 |

* cited by examiner

200

INITIAL KNOWN LOCATIONS

| Network Address | Addr. Type | Date | Time | City | Country | Tile in Fig2A |
|---|---|---|---|---|---|---|
| 128.1.1.1 | IPv4 | 1/1/2018 | 10:42 AM | London | England | 216C |
| 128.1.2.2 | IPv4 | 1/1/2018 | 12:01 PM | Edinburgh | Scotland | 204A |
| 2607:fb90:6c1:9825:78b7:9ce5:9541:d195 | IPv6 | 1/1/2018 | 3:56 PM | London | England | None |

FIG. 2D

DETERMINING GEOGRAPHIC LOCATIONS OF NETWORK DEVICES

TECHNICAL FIELD

This disclosure generally relates to determining geographic locations of devices or users based on network addresses of computing devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, online services or applications, which may be provided by a social-networking system, may include location-based features that may provide information or perform other actions based on a user's geographic location. The location-based features may include, for example, recommendations for nearby places or events. The geographic location of the user's client system is not necessarily available to online services, however, as client systems do not necessarily provide their geographic locations to the online services. A location prediction system may determine one or more predicted locations of the user's client system and corresponding weights. Each weight may represent a probability, e.g., a degree of confidence, that the corresponding predicted location is the true location of the network address. The predicted locations and confidence weights may be determined based on features such as previous known locations of the user's client system, previous or updated known locations of other client systems having network addresses similar to a network address of the user's client system, location features derived from network addresses, and the ages of the previous or updated known locations of the client systems. As time passes, the weights may decay, which may represent decreasing confidence in the accuracy of predicted locations that were determined based on aging information such as the previous known locations. The predicted locations and associated weights may be determined at least in part by a machine-learning-based prediction model, which may be trained on data such as the location features, time stamps, and the known true locations of particular client systems In particular embodiments, an online service or application may submit a location query to request a predicted location for a specified network address from a network server. In response to the location query, the prediction model may infer one or more predicted locations of the network address by identifying similar addresses having known true locations, and identifying one or more of the known true locations as predicted locations of the network address. The prediction model may be trained to identify the predicted locations based on broadened variants of network addresses that have known locations. The broadened variants of the network addresses may be generated by, for example, truncating the network addresses to remove one or more of the most-specific portion(s) of the network address. Broadened addresses from which one or more components have been removed may match other addresses having other values for those components. The prediction model may infer locations of a network address by identifying broadened addresses that the network address matches. The known locations of the broadened addresses may be used as the predicted locations of the specified network address and provided in response to the request for the predicted location.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 2D illustrates an example prediction table that includes location predictions generated for the example network addresses and locations shown in FIGS. 2B and 2C.

DESCRIPTION OF EXAMPLE EMBODIMENTS

Figure 1A:
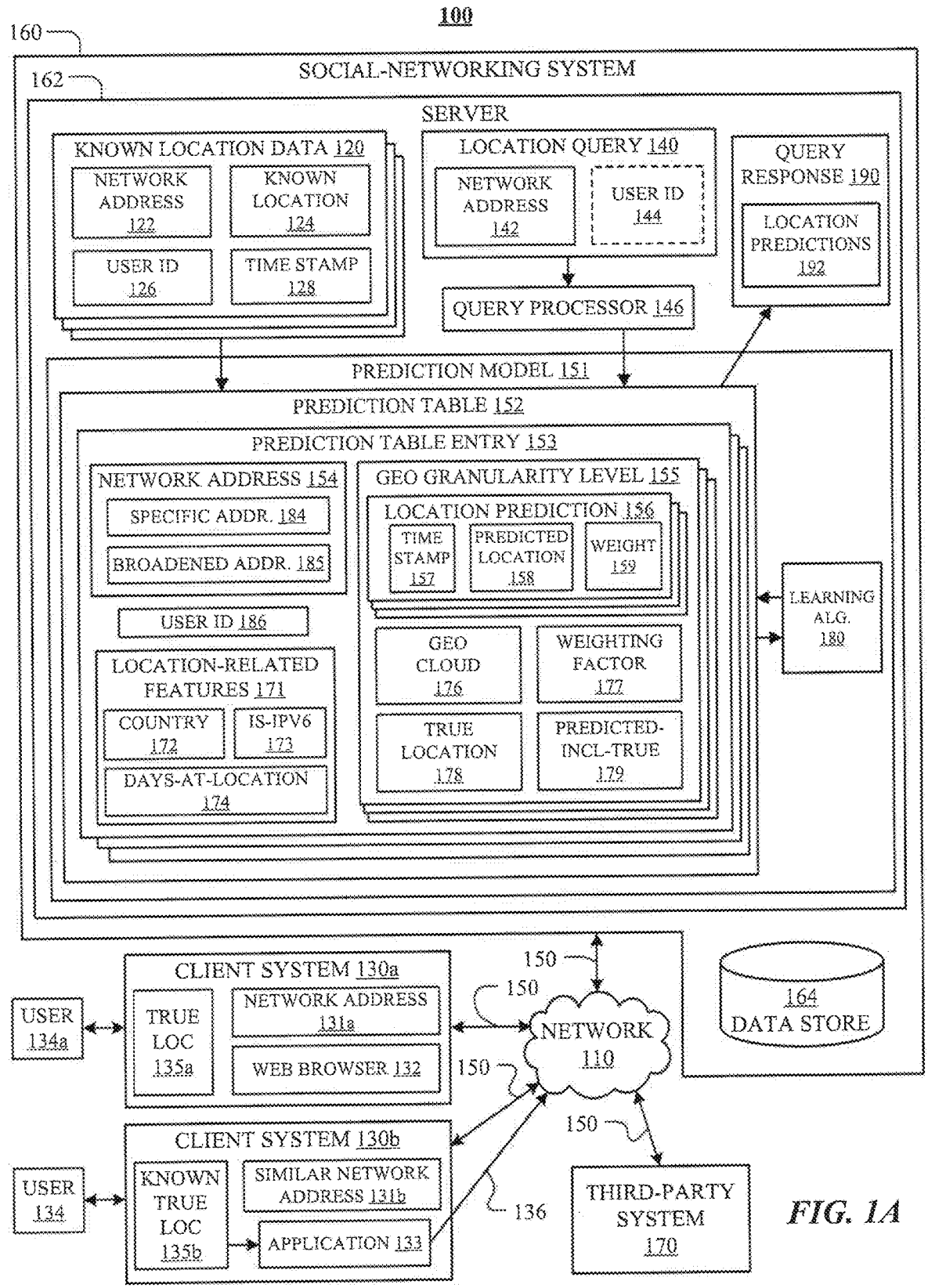
FIG. 1A illustrates an example network environment associated with a social-networking system including features for predicting locations of users or network addresses.

FIG. 1A illustrates an example network environment 100 associated with a social-networking system including features for predicting locations of users or network addresses. Network environment 100 includes one or more client systems 130, a social-networking system 160, and a third-party system 170 connected to each other by a network 110. Although FIG. 1A illustrates a particular arrangement of client systems 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1A illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client systems 130a, 130b, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, each client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130a may enable a network user 134a at client system 130a to access network 110. A client system 130a may enable its user 134a to communicate with other users 134b at other client systems 130b.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user 134 at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user 134. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user 134b of social-networking system 160 with whom a user 134a has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user 134 might be interested, computer-based applications that a user may use, transactions that allow users 134 to buy or sell items via the service, interactions with advertisements that a user 134 may perform, or other suitable items or objects. A 134 user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users 134 to interact with each other as well as receive content from third-party systems 170 or other entities, or to allow users 134 to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user 134, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user 134 can add, upload, send, or "post" to social-networking system 160. As an example and not by way of limitation, a user 134 communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users 134. The connection information may indicate users 134 who have similar or common work experience, group memberships, hobbies, educational history, or are in any way related or share common attributes. The connection information may also include user-defined connections between different users 134 and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user 134 determines how particular information associated with a user 134 can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users 134. Advertisement-pricing modules may combine social information, the current time, location information, or other suitable information to provide relevant advertisements, in the form of notifications, to a user 134.

In particular embodiments, online services or applications, which may be provided by a social-networking system 160, may include location-based features that may provide information or perform other actions based on a user's geographic location. The location-based features may include, for example, recommendations for nearby places or events. A user's geographic location may correspond to a geographic location 135a of the user's client system 130a. The geographic location 135a of the client system 130a is not necessarily available to online services, however, as client systems 130a do not necessarily provide their geographic locations 135a to the online services. In particular embodiments, a location prediction system may determine one or more predicted locations 158 of the user's client system 130a and corresponding weights 159. Each weight 159 may represent a probability, e.g., a degree of confidence, that the corresponding predicted location 158 is the true location 135a of the network address 131a. The predicted locations 158 and confidence weights 159 may be determined based on features such as previous known locations 124 of the user's client system 130a, previous or updated known locations 124 of other client systems 130b having network addresses 131b similar to a network address 131a of the user's client system 130a, location features 171 derived from network addresses 131b, and the ages of the previous or updated known locations 124 of the client systems 130. As time passes, the weights may decay, which may represent decreasing confidence in the accuracy of predicted locations 158 that were determined based on aging information such as the previous known locations 124.

For example, the weights may decrease over time based on the increasing difference between a current time and date and a time stamp 157 associated with the corresponding predicted location 158. The time stamp 157 may represent a time at which the corresponding predicted location 158 was determined based on, for example, previous known locations 124. The predicted locations 158 and associated weights 159 may be determined at least in part by a machine-learning-based prediction model 151, which may be trained on data such as the location features 171, time stamps 157, and the known true locations 135b or particular client systems 130b. The true location 135 known at each client system 130 may be the correct geographic location of a client system 130 at a point in time, or an approximation of the correct location at the point in time. The true location 135 may be, e.g., latitude and longitude coordinates determined by the client system 130 using, e.g., a GPS, WIFI triangulation, or other suitable technique. The prediction model 151 on the server 162 may receive the true locations 135b of client systems 130b as part of known location data 120, which may be retrieved from a database, e.g., when the prediction model 151 is trained or otherwise initialized, and alternatively or additionally received via messages from client systems 130.

In particular embodiments, an online service or application may submit a location query 140 to request a predicted location 158 for a specified network address 142 from a network server 162. In response to the location query 140, the prediction model 151 may identify one or more predicted locations 158 of the specified network address 142, for which the true location is unknown, by identifying similar addresses 131b having known true locations 135b and identifying one or more of the known true locations 135b of the network addresses 131b as predicted locations 158 of the specified network address 142.

In particular embodiments, the prediction model 151 may be trained to identify the predicted locations 158 based on broadened variants 185 of network addresses 131b that have known locations 135b. The broadened addresses 185 may be provided as configuration parameters, e.g., by a system administrator. As another example, the broadened addresses 185 may be determined automatically, e.g., by removing a predetermined number of the least-significant components from each specific address 184. The broadened variants 185 of the network addresses 131b may be generated by, for example, truncating the network addresses 131b or 184 to remove one or more of the most-specific portion(s) of the network address. Broadened addresses 185 from which one or more components have been removed may match other addresses having other values for those components. The prediction model 151 may infer locations 158 of a network address 142 by identifying broadened addresses 185 that the network address matches. The known locations 135b of the broadened addresses 185 may be used as the predicted locations 158 of the specified network address 142 and provided in response to the request 140 for the predicted location.

As an example, the address 128.1.1.1 may be broadened to 128.1.1, and the broadened address may match any valid network address in the range 128.1.1.0 through 128.1.1.255. The model 151 may infer the locations of a network address 131a by identifying broadened addresses that the network address 131 matches. The known locations of the broadened addresses may be used as the potential locations of the network address 131a.

In particular embodiments, the prediction model 151 may be generated from the known locations 124 and network addresses 122 of other client systems 130b. The known locations 124 and associated network addresses 122 may be received by the servers 162 from, for example, a database of previously-identified locations and, alternatively or additionally, from the other client systems 130b via the network 110, and stored as known location data 120. The prediction model 151 may include a prediction table 152 in which one or more prediction table entries 153 for use in inferring locations may be stored. Optionally, known location data 120 may include a user identifier ("ID") 126 instead of or in addition to the network address 122. The user ID 126 may identify a user, who may be associated with the network address 122 and may be at the known location 124. The prediction table 152 may be used as a lookup table to identify predicted locations of network addresses 142 in response to queries 140. Each prediction table entry 153 may be stored in, e.g., a row in a database table.

Each prediction table entry 153 may correspond to one or more network addresses 154. The prediction table entry 153 may associate the network addresses 154 with one or more predictions 156 of the location of the network address 154. The network address 154 may be a specific address 184, one or more broadened addresses 185 that represent multiple network addresses, or a combination of both address types. The specific address 184 may be a network address suitable for communicating via the network 110, e.g., an Internet Protocol (IP) address such as 128.1.1.1 (IPv4), 2001:db8: 85a3:0:0:8a2e:370:7334 (IPv6), or other address used in another suitable network protocol. Thus, each prediction table entry 153 may associate a network address 154 with one or more location predictions 156.

Each location prediction 156 may include a time stamp 157, a predicted location 158 of the network address 154, and a weight 159. Each predicted location 158 may be copied from or otherwise based on a known location 124 received in known location data 120. The time stamp 157 may represent a time at which a known location 124 containing the predicted location 158 was received, an age of the predicted location 158, or other time-based value related to the age of the predicted location 158. A predicted location 158 may be understood as an estimate or approximation of a device's current location based on available information, e.g., the prediction model's determination of where the device associated with the network address is physically located at the time the prediction is made. A user identifier ("ID") 186 may optionally be included in each prediction table entry 153 to identify the user associated with the network address 154. The user ID 186 may be based on the user ID 126 included in the known location data 120.

The prediction table 152 may be stored in a memory of a computing device such as server 162. The prediction table 152 may also be stored in a data store 164, e.g., in a location store that is stored in the data store 164, or other suitable storage media. Although particular arrangements of data in data tables are described herein, other arrangements may be used. For example, although a single data table is described, multiple related data tables that each store portions of the data may be used. Further, although data is described herein as being stored in a table having rows and columns for explanatory purposes, any suitable data structure may be used to store the data described herein. The location prediction system may receive known locations at any time, though the prediction model 151 may be updated at periodic intervals based on known location data 120 received during each time interval, e.g., hourly, daily, or weekly.

In particular embodiments, each weight 159 may represent a probability that the true location of the corresponding network address 154, and thus of the client system 130 having the corresponding network address 154, corresponds to the predicted location 158. Each weight 159 may be a numeric value, e.g., between 0 and 1, between 0 and 100, or the like. Each weight 159 may be interpreted as a degree of confidence that the network address 154 is located at the predicted location 158, a degree of confidence in the accuracy of the corresponding predicted location 158, or a probability that the next location of the corresponding network address 154 will be the predicted location 158 associated with the weight 159. The location predictions 156 may represent a histogram of predicted locations 158 and associated confidence values that correspond to the weights 159.

The predicted location 158 having the highest weight 159 may be the most likely location of the specified client system 130, according to the prediction model 151, at the time of the prediction is made. The predicted locations 158 may be sorted by weight to produce a list of the predicted locations 158 in order of likelihood of being the true location of the network address 154. As an example, if the model 151 generates more than one predicted location 158, the associated weights 159 may be used to determine a ranking of the predicted locations 158 in order of confidence.

In particular embodiments, to request a location prediction for a particular network address 142, an online service or application located on a server 162 or other computing device may submit a location query 140 to the prediction model. The location query 140 may include the network address 142 of the client system 130b to be located. The location query 140 may be received by, for example, the server 162 via the network 110. The location query 140 may be received by a query processor 146, which may query the prediction table 152. The received network address 142 may be provided as input to the query processor 146. The online service or other client of the location prediction system may receive the predicted locations 158 and associated weights, 159 e.g., in a query response 190, and may select, e.g., based on the weights 159, one or more of the predicted locations 158 from the location predictions 192 to use as approximate current location(s) of the client system 130a. Alternatively, the predicted location 158 having the highest weight may be provided in the query response 190.

The location query 140 may include a user ID 144 of a user associated with the client system 130b to be located. The user ID 144 may be mapped to a network address by the server 162 or, if the prediction table 152 includes a user ID 186 associated with each network address 154, the user ID 144 may be used in a query by the query processor 146. The query processor 146 may search the prediction table 152 for a prediction table entry 153 that matches the query, e.g., an entry 153 having a specific address 184 that matches the network address 142 or a user ID 186 that matches the user ID 144. If a match is found, then the location predictions 156 of the prediction table entry 153 having the matching specific address 184 or user ID 186 may be used as resulting location predictions 192 in a query response 190. However, if a match is not found, as may be the case for a network address 142 that does not match a specific address 184 in the prediction table 152 (e.g., an IP address for which known location data 120 has not been received), then the prediction table 152 may be searched for a broadened address 185 that matches the network address 142.

As an example, if the server 162 receives a location query 140 specifying a specific address 142 having a value "128.1.1.5", but the prediction table 153 does not include a prediction table entry 153 having a specific address 184 with the value "128.1.1.5", then when the query processor 146 searches the prediction table 152 for the network address 142, no result is found. The query processor 146 may then search the prediction table 152 for one or more broadened addresses 185 that match the specific address 142. A broadened address 185 may match a specific address 184 when, for example, the specific address 184 is included in the range of the broadened address 185. In the example above, a prediction table entry 153 that includes a broadened address 185 with the value "185.1.1" matches the address "128.1.1.5" in the query and the associated location predictions 156 may be used as resulting location predictions 192 in a query response 190.

In particular embodiments, the learning algorithm 180 may use machine-learning techniques to generate the prediction model 151. The prediction model 151 may be refined using a feedback loop that evaluates how well the model 151 performs at making predictions. The weights 159 of the predicted locations 158 may be generated based on one or more features. The learning algorithm 180 may refine the location prediction(s) 156 associated with each network address 154 by, for example, changing the values of the weights 159 to more accurately rank the location predictions 156. The weights 159 may be based at least in part on a weighting factor 177. The weighting factor 177 may be a value between 0 and 1, or other suitable value for scaling the weights 159. The weights 159 may be calculated by multiplying previous values of the weights 159 by the weighting factor 177. The features may include an age or other time-based quantity related to the corresponding predicted location 158. The age may be based on a time stamp 157 associated with the predicted location 158, for example. The time stamp 157 may represent a time at which the value of the predicted location 158 was determined or received, for example. Each weight 159 may be reduced as the age of the corresponding predicted location 158, e.g., as the difference between a current time and the time stamp 157, increases.

As an example, each weight may be decreased by exponential decay using a daily reduction factor such as 0.5, 0.75, 0.8, or the like. Location predictions 156 may be deleted when their age (based on, e.g., their included time stamp 157) exceeds a threshold, e.g., 20 days, 28 days, 30 days, 2 months, or the like. The weights 159 may be decreased based on the time stamp 157 by including the age of the predicted locations 158 in the determination of the weighting factor 177. The learning algorithm 180 may generate the weighting factor 177 based on the time stamp 157 and other factors such as the location-related features 171. The learning algorithm 180 may apply the weighting factor 177 to the weights 159 of each prediction table entry 153 by multiplying each weight 159 by the weighting factor 177 and replacing the existing value of each weight 159 with the result of the multiplication.

In particular embodiments, for each prediction table entry 153, the sum of the weights 159 of the predicted locations 158 in the table entry 153, including the "other" location weight (if one has been determined) may be 1.0 if the weights are probabilities ranging from 0 to 1.0, or other appropriate maximum probability value, e.g., 100 if the weights are percentages.

In particular embodiments, when additional known location data 120 are received, the learning algorithm 180 may update the weights 159. As an example, for the IP address 128.1.1.1, the initial weights for three cities in the example above, Bath=1.0, Birmingham=1.0, London=0.25, may be updated to Bath=0.6, Birmingham=0.1, London=0.3 by the learning algorithm 180 to indicate that the IP address is likely to be in Bath with a probability of 0.6, in Birmingham with a probability of 0.1, or in London with a probability of 0.3. In response to receiving one or more "additional" items of known location data 120, the learning algorithm 180 may update the prediction table 152 as follows. The learning algorithm 180 may determine whether there is an existing prediction table entry 153 having the same network address 122 as the additional known location data 120. If there is an existing prediction table entry 153, then the learning algorithm 180 may add the additional known location 124 and time stamp 128 to the location predictions 156 of the existing prediction table entry 153. If there is no existing prediction table entry 153, then the learning algorithm 180 may create a new prediction table entry 153 and add the additional known location 124 and time stamp 128 to the location predictions 156 of the new prediction table entry 153. In this way, the known location 124 of each item of known location data 120 may be added to the prediction table 152.

As an example, if the learning algorithm 180 determines that the predicted locations 158 in a prediction table entry 153 for a network address 154 are weakly informative of the location from which the next communication from a client system 130 having the network address 154 will be sent, then the learning algorithm 180 may generate a reduced weighting factor 177 to reduce the weights 159 of the predicted locations 158 for that prediction table entry 153.

In particular embodiments, if the sum of the weights 159 of the predicted locations 158 is reduced to less than the maximum weight value (e.g., 1.0 or 100%), then the difference may be allocated to an "Other" weight. For example, the "Other" weight may be determined by subtracting the sum of the weights 159 of the predicted locations 158 from 1.0 (or other appropriate value that represents a maximum probability, such as 100 if percentages are being used). The "Other" weight may be understood as an indication of the probability that the next communication from a client system 130 will be sent from a location other than one of the predicted locations 158. That is, the "Other" weight may represent a probability that the true location of the network address does not correspond to one of the predicted locations 158. The "Other" weight may optionally be included in the location predictions 192 sent in response to a query 140 for the network address 154.

In particular embodiments, the weighting factor 177 may represent a probability that the true location of the network address, which is not necessarily known, corresponds to one of the predicted locations 158. The weighting factor 177 may be calculated based on the location-related features 171, a true location 178 (if known), a predictions-include-true value 179, which may be true if one of the predicted locations 158 includes the true location 178 (as may occur if the true location is known), and the time stamp 157 associated with one or more of the location predictions 156. The location-related features 171 may include features that are predictive of whether the predicted locations 158 and associated weights 159 form an accurate prediction of the true location of the network address 154. In particular embodiments, the location-related features 171 may include country 172, is-ipv6 173, which indicates whether the network address 154 is an IP address, and days-at-location 174, which may be a number of days the network address has been at its current (e.g., most recent) location. The value of days-at-location 174 may be based on the time stamps 157 and the predicted location 158, for example.

In particular embodiments, the learning algorithm 180 (or other component of the location prediction system) may generate a geo cloud 176 for each network address 154 based on the location predictions 156 of the network address 154. A geo cloud 176 may be a shape, such as an oval or polygon, that encloses the predicted locations 158 associated with a network address 154. Each geo cloud 176 may be divided into sub-regions corresponding to the individual predicted locations 157. In particular embodiments, any location in a particular geographic sub-region may correspond to the predicted location 158 of that sub-region. A true location 178 may be determined to correspond to, e.g., be included in, a predicted location 158 if the sub-region associated with the predicted location 158 includes the true location 178. The location-related features 171 may be predictive of whether the geo cloud 176 and associated weights 159 form an accurate prediction of the true location of the network address 154.

In particular embodiments, for each of the predicted locations 157 enclosed in the geo cloud 176, the perimeter of the geo cloud 176 may be at least a threshold distance from the predicted location 158. The geo cloud 176 may be divided into sub-regions such that each predicted location 158 in the geo cloud 176 is in a different sub-region. The sub-regions may be used to broaden the area that corresponds to each predicted location 158. For example, to determine whether a location corresponds to one of the predicted locations 158, the learning algorithm 180 may determine whether the location is in the sub-region that corresponds to the predicted location 158. The weight 159 associated with each predicted location 158 may thus be associated with the sub-region that corresponds to the predicted location 158.

In particular embodiments, the weighting factor 177 may be learned from the location-related features 171 and other features of the prediction table entry 153 using a machine-learning technique, such as gradient descent, or the like, to minimize a cost function. When provided as input to the cost function, values of the features that indicate the location is static, e.g., not moving frequently, may produce lower values of the cost function. Conversely, values of the features that indicate the location is moving frequently may produce higher values of the cost function. Location predictions 156 associated with features that may indicate the location is moving frequently may thereby be penalized when learning the weighting factor 177, which may result in a lower weighting factor 177 for those location predictions 156.

The cost function's value may be based on one or more of the features associated with the network address, such as the location features 171 (e.g., the country 172, is-ipv6 indicator 173, and days-at-location 174), the geo cloud 176, the true location 178 (if known), and the predicted-included-true indicator 179 (if known), or the weights 159 of the predicted locations 158. The cost function may be a function that generates smaller values for features that indicate a higher probability that a predicted location corresponds to a true location of a network address, and greater values for features that indicate a lower probability that a predicted location corresponds to the true location. The weighting factor 177 may be related to the cost function, e.g., inversely proportional to the cost function. The learning algorithm 180 may generate the weighting factor 177 based on the cost function, so the relation between the weighting factor and the cost function may be determined by the learning algorithm 180.

In particular embodiments, a separate weighting factor 177, or an intermediate value for determining the weighting factor 177, may be generated and stored in association with each of the location-related features 171. For example, the cost function's value may be based on one or more of the following features: whether the predicted location 158 includes (or otherwise corresponds to) the true location 178 of network address 157 (if known), whether the predicted location 158 is in the country 172 associated with the network address 157 (e.g., according to a lookup table of countries associated with network addresses), whether the network address is an IPv4 or IPv6 address (specified by is-ipv6 173), and the number of days the network address has been detected or seen at its current location or in the same location (specified by days-at-location 174).

As an example, if the predicted location 158 includes the true location 178 of the network address, then the cost function may produce a lower value, particularly if the true location 178 is a recent value. In that case, since the true location 178 is known, and the predicted location corresponds to the true location, the predicted location 158 is presumably accurate. Otherwise, if the true location 178 is unknown, the value of the cost function may be unaffected by the true location 178. If the true location 178 is known, but the predicted locations 158 do not include the true location 178 (e.g., predicted-includes-true 179 is false), then the value of the cost function may be increased. If a network address 154 is moving frequently, then knowing the past locations of the network address 154 may be less useful than if the network address 154 has remained in a static location.

As another example, if the country 172 associated with the network address 154 is the same as the country in which the predicted location 158 is located, then the cost function may produce a lower value than if the countries are different, since the predicted location 158 is presumably at least in the same country as the true location 178. Conversely, if the country 172 is not the same as the country in which the predicted location 158 is located, the cost function may produce a lower value. As a further example, the cost function may produce a lower value for greater values of days-at-location 174, since greater values indicate the location of the network address 154 is more static. Knowing the past locations of the network address 154, such as the predicted locations 158, may be more useful when the network address 154 has remained in a static location for a longer period of time. Conversely, the cost function may produce a higher value for lower values of days-at-location 174, since lower values indicate the location of the network address 154 changes more frequently. Knowing the past locations of the network address 154 may be less useful when the network address 154 has moved around frequently.

In particular embodiments, actual values for the location-related features 171 may be learned by the learning algorithm 180 based on data values that correspond to the features. For example, the country feature 172 may have an actual value such as "300" assigned by the learning algorithm 180 to indicate a degree to which the country in which the network address 154 is located influences or is predictive of the value of the predicted location 158 and/or the corresponding weight 159. The actual value of the country feature 172 (e.g., "300") assigned by the learning algorithm 180 may thus be based on a corresponding data value, e.g., the country in which the network address 154 is located. The corresponding data value, e.g., "England", on which the country feature 172 is based, may be stored in association with the country feature 172 or may be determined based on the network address 154 on demand, for example. Similarly, the is-ipv6 feature 173 may have an actual value such as "100" assigned by the learning algorithm 180 to indicate a degree to which the IP protocol version influences or is predictive of the value of the predicted location 158 and/or the corresponding weight 159. The corresponding is-ipv6 data value, on which the is-ipv6 feature 173 is based, may be a Boolean value (e.g., true or false) number (e.g., 0 or 1) that indicates whether the network address 154 is an IPv4 address or an IPv6 address. The is-ipv6 Boolean value may be stored in association with the is-ipv6 feature 173 or may be determined based on the network address 154 on demand, for example The days-at-location feature 174 may be a number, e.g., "50", assigned by the learning algorithm 180, and may be based on the number of days the network address has been at its current location. The number of days, e.g., "7", on which the days-at-location feature 174 is based, may be determined based on the time stamp 157 or on other suitable data. For example, the prediction table entry 153 may be evaluated each day, e.g., to re-calculate the weights 159, the weighting factor 177, and other values as appropriate. A data value indicating the number of days at one or more of the predicted locations 158 (e.g., the highest-weighted of the predicted locations 158) may be associated with the location-related features 171 and incremented each day that the most predicted location 158 does not change, or set to zero if the highest-weighted predicted location 158 changes. If the true location 178 is known, then the number of days may be incremented each day the true location 178 does not change, or set to zero if the true location 178 changes. The number of days and the current location associated with the number of days may be stored in association with the days-at-location feature 174. The number of days may be consecutive days or, alternatively, a total number of days regardless of whether the days are consecutive.

In particular embodiments, the prediction table 152 may initially be generated based on a set of previously-received known location data 120. The previously-received known location data 120 may include a corpus of network address location data stored in, e.g., a database table of initial locations. The known location data 120 may be received by the prediction model 151 and stored in the prediction table 152 for use in determining the predicted locations 158. Each predicted location 158 may be based on a corresponding known location 124. For example, the known locations 124 may be copied to form the predicted locations 158. The prediction table 152 may be updated over time based on additional known location data 120 as they are received. For example, received known location data 120 may include network addresses 122 that (a) have not previously been "seen" by the model, e.g., are not stored in the prediction table 152, (b) have previously been seen by the model but have moved to a different known location 124 because the corresponding client system 130 has physically moved, or (c) have previously been seen by the model but have moved to a different known location 124 because the network service provider has re-assigned the network address to a different client system 130 having a different known location 124.

In particular embodiments, the broadened addresses 185 may be used by the prediction model 151 to infer locations of queried-for network addresses 142 for which the prediction table 152 does not include an entry 153 having a matching specific address 184, but does have a prediction table entry 153 having a matching broadened address 185. The broadened addresses 185 may be generated by broadening one or more specific addresses 184, such as the specific address 184 or other broadened addresses 185 associated with the prediction table entry 153. The broadening operation may be invoked by the prediction model 151, e.g., by removing certain components of each specific address 184 when the specific address 184 is added to the prediction table 152, e.g., by removing the most-specific component to generate a first broadened address 185 and the second-most-specific component to generate a second broadened address 185. As an example, when the model 151 receives a specific address 122 having a known location 124, the model 151 may generate one or more broadened addresses 185 by removing one or more of the components of the specific address 122, e.g., by removing one or more of the most-specific components.

Each broadened address 185 may identify a set of addresses, e.g., a range of consecutive addresses. The broadened addresses 185 may be generated by removing or otherwise designating one or more components (e.g., octets or hextets, or smaller units such as digits or bits) from other network addresses. A broadened address 185 may represent a set of specific addresses having any values in place of the removed or otherwise designated components. The components may be removed from specific addresses 184 or other broadened addresses 185 associated with the prediction table entry 153, for example. The broadened address 185 may be, for example, a truncated network address (e.g., 128.1.1) that represents a set of addresses (e.g., 128.1.1 may represent valid addresses in the range 128.1.1.0 through 128.1.1.255).

For example, the specific address 97.46.193.19 may be used to generate the broadened address 97.46.193 by removing the last component. The broadened address 97.46.193 may match any specific address for which the first three components are 97.46.193, e.g., any valid address in the range 97.46.193.0 through 97.46.193.255. The last (rightmost) component of an IP address, for example, is the most specific, and may correspond to a smaller geographic area than the other components. Thus, addresses that match the broadened address 97.46.193 are ordinarily more likely to be located near each other than are two addresses selected at random.

In particular embodiments, the broadened addresses 185 may be generated by excluding or removing one or more digits from the most-specific (e.g., narrowest) end of the network address. The broadened address 185 may be represented as a truncated network address, e.g., an IP address from which one or more components have been removed. The excluded or removed digits may be excluded from the network address. Each removed digit is shown as a wildcard character herein for explanatory purposes. A digit may be a decimal, hexadecimal, binary, or other type of digit. For example, the specific IP address 128.1.1.123 may be broadened to 128.1.12x, wherein x is a digit between 0 and 9. In this example, the last octet, 123, is the most-specific component, and the right end of the address is the most specific end, since IP addresses may be represented as a sequence of components (e.g., octets or hextets) in which the left-most component is the least-specific (e.g., broadest) and the right-most component is the least-specific (e.g., narrowest). For IP addresses, broader components may correspond to larger geographic regions than narrower components. As an example, the address 128.1.1.12x may correspond to any valid IP address in the range 128.1.1.120 through 128.1.1.129. In further examples, the address 128.1.1.x may correspond to any valid IP address in the range 128.1.1.0 through 128.1.1.255. and the address 128.1.x.x may correspond to any valid IP address in the range 128.1.0.0 through 128.1.255.255. Other representations of broadened addresses may be used instead of the wildcard representation. For example, an index number or pointer may be associated with a network address, and the index may identify the least-specific digit of the address that is to be retained. Any digits less significant than the one identified by the index may be excluded from the network address for purposes of predicting locations.

In addition to making inferences based on specific addresses, the learning algorithm 180 may also make inferences based on broadened network addresses, which may be understood as ranges of network addresses. IP addresses, for example, may be represented as sequences of numbers that may be octets (IPv4) or hextets (IPv6), with the first number in the sequence ordinarily corresponding to a broader geographic region than the second number, and so on, such that the last number corresponds to the smallest geographic region of the numbers in the address. Predictions may be made for ranges of network addresses because addresses in a range are likely to be located near each other. The learning algorithm 180 may pool across the range of network addresses such as 100.100.100.0 through 100.100.100.255. If a location query 140 is received for the IP address 100.100.100.7, but that address has not been seen, e.g., there is no prediction table entry 153 having that address, a prediction may still be made for that address if there is a prediction table entry 153 for another address in a range for which addresses have been pooled. For example, if there is a prediction table entry 153 for the address 100.100.100.3, then a prediction may be made for 100.100.100.7 if IP addresses 100.100.100.0 through 100.100.100.255 have been pooled.

As introduced above, a predicted network address for a client system 130a may be determined based on similarities between the specified network address 142 and network addresses 122 of the other client systems 130b. For example, the IP addresses 128.1.1.1 and 128.1.1.5 are similar because they differ only in the last octet. If the location of 128.1.1.1 is known, then the location of similar addresses such as 128.1.1.5 may be predicted based on the location of 128.1.1.1. The known locations 120 used for predicting device locations may be received from, for example, application programs executing on one or more of the other client systems 130b. An IP address may be truncated by removing the last number in the address, or by replacing the last number with a special values such as "X" that indicates any valid number (e.g., 0-255 for IPv4). Such a truncated IP address thus represents a range of addresses. For example, the IP address 100.100.100.123 may be truncated to 100.100.100, which may be written as 100.100.100.X for explanatory purposes. This truncated IP address may represent any IP address from 100.100.100.0 to 100.100.100.255. Other truncation may be used, e.g., 100.100.100.12X may represent any IP address between 100.100.100.120 and 100.100.100.129. The truncation may be repeated to further broaden the IP address. For example, 100.100.X.X represents any IP address from 100.100.0.0 to 100.100.255.255.

In particular embodiments, a prediction table entry 153 may include one or more broadened addresses 185. For example, a table entry 153 may include the broadened addresses 100.100.100.X and 100.100.X.X. Alternatively, a prediction table entry 153 may be created for each broadened network address 185. For example, a table entry 153 may be created having a broadened address 185 of 100.100.100.X, and another table entry 153 may be created having a broadened address 185 of 100.100.X.X. The location query processor 146 may search the prediction table 152 for specific prediction table entries 153 that have the same IP address as a location query 140. If no table entries having the same IP address are found, then the location query processor 146 may search the prediction table 152 for truncated addresses that match the location query 140.

As an example, if the location query 140 is for the IP address 100.100.100.7, but there is no entry for that address in the prediction table 152, then the query processor 146 may search the prediction table 152 for broadened addresses 185 that match 100.100.100.7. If there are two broadened addresses, 100.100.X.X and 100.100.100.X, then the query processor 146 may identify the most-specific broadened address, which is 100.100.100.X in this example, and search the prediction table 152 for specific addresses that match the more-specific broadened address 100.100.100.X. An entry 153 for 100.100.100.3 may be identified, and the location predictions 156 in the identified entry 153 may be returned as a result in a query response 190. Alternatively, if the entry 100.100.100.3 is not present in the table 152, and there are no other entries in the table 152 that match the broadened address 100.100.100.X, then the query processor 146 may search for entries 153 that match the less-specific broadened address 100.100.X.X that was identified previously, and a matching entry such as 100.100.12.5 may be identified and used for the query response 190.

In particular embodiments, the model 151 may be trained to infer one or more predicted locations 158 that approximate the true locations 135a of network addresses 131a. The probability that each predicted location 158 corresponds to the true location 135a of the network address 131a may be specified by the respective weight 159. The network addresses 131a do not have known locations 124, and are thus not specifically included as network addresses 154 in the prediction model 151. Inferring the predicted locations 158 may involve identifying a prediction table entry 153 having a broadened address 185 that matches the network address 131a, and using the identified prediction table entry 153 to determine the predicted locations 158 of the network address 131a. As an example, a broadened address 185 may match a specific address 184 if each of the components of the broadened address 185 is present at the corresponding position in the specific address 184. The model 151 may be used to infer the predicted locations 158 of specific addresses 131a by searching the prediction table 152 for one or more entries 153 having broadened addresses 185 that match the specific address 131a. For example, if an entry 153 has the broadened address 97.46.193, then any valid address in the range 97.46.193.0 through 97.46.193.255 matches the broadened address 97.46.193, and the predicted locations 158 and weights 159 may be used to generate location predictions 192 for a query response 190 for any valid address in that range. For example, the predicted locations 158 and corresponding weights 159 may be copied to the location predictions 192 of the query response 190.

As shown by the inclusion of both the specific address 184 and the broadened address 185 in the network address 154, the prediction model 151 may associate a broadened address 185 with the same prediction table entry 153 as the corresponding specific address 184. The corresponding specific address 184 may be the network address from which the broadened address 185 is derived. As an example, a broadened address 185 may be included in the same prediction table entry 153 as the corresponding specific address 184. Alternatively or in addition, a broadened address 185 may be included in a separate prediction table entry 153 that does not have a specific address 184 but does have the same location predictions 156 and location features 171 as the prediction table entry 153 that contains the corresponding specific address 184. In another example, a broadened address 185 may be included in a separate prediction table entry 153 that does not have a specific address 184 but does have a copy of each attribute of the prediction table entry 153 (e.g., the same location predictions 156, values 176-179, location features 171, and user ID 186) as the prediction table entry 153 that contains the corresponding specific address 184. In still another example, the broadened address 185 and the network address 154 may be stored in separate prediction table entries 153 while sharing the same values for other attributes of the prediction table entry 153, e.g., by including a reference or pointer in the prediction table entry 153 having the specific address 184 to the entry 153 having the broadened address 185, or vice-versa. In yet another example, a broadened address 185 may be stored in a prediction table entry 153 without a specific address 184 and without a counterpart prediction table entry 153 having a corresponding specific address 184, since the broadened address 185 includes the specific address 154.

In particular embodiments, location predictions may be made for a particular network address 154, at multiple geographic granularities 155, e.g., country, region, state, city, zip code, tile, neighborhood, and other suitable units. Different weighting factors 177 may be learned for different granularity levels 155. For example, a network address 154 may move frequently within a city, but may remain in the same country for long periods of time. Thus, predicted locations 158 in the city may be less likely to be true locations, and the weighting factor 177 at the city level 155 may be lower than a weighting factor 177 at the country level, in which predicted locations 155 may be more likely to be true locations. Since the weighting factors 177 of different granularity levels 155 may be different, the sets of weights 159 of different granularity levels (which may be based on the weighting factors 177) may also be different. Thus, predicted locations 158 at different granularity levels 155 may have different probabilities of corresponding to true locations.

Each prediction table entry 153 may include one or more geographic granularity levels 155. Each location prediction 156 and corresponding set of data values 176-179 may be associated with a geographic granularity level 155. Each geographic granularity level may be, e.g., a zoom level, such as "tile level 14" zoom or "800 meters by 800 meters." The predictions 156 may be for a particular geographic granularity level 155. The geographic granularity level 155 may be understood as a map zoom level or map scale, and may be a zoom level such as 800 meters by 800 meters or country, region of country, city, zip code, or map tile level. There may be different location predictions 156 for each geographic granularity level. For example, a network address 154 may have a predicted location 158 at the country level of "England" with a weight of 0.8, and a predicted location 158 at the city level of "London" with a weight of 0.7. The geo cloud 176, true location 178, and predicted-includes-true 178 may also be different for different granularity levels 155. In particular embodiments, coarser granularities, e.g., the country level, may reduce the amount of computations needed to train the model and make predictions, at the expense of reduced prediction accuracy. Courser granularities 155 may also be used to comply with privacy restrictions.

The predicted locations 158 at different granularity levels 155 may correspond to the same geographic location (e.g., having the same latitude, longitude coordinates), or to different geographic locations (e.g., different latitude, longitude coordinates). For example, if a single known location 124 is received in known location data 120, then the single known location may be used to determine the predicted location 158 for each granularity level 155. Thus, if the known location of address 128.1.1.1 is London, England according to an item of known location data 120, then the predicted location 158 at the country level may be England, and the predicted location 158 at the city level may be London. As another example, if a separate item of known location data 120 contains a known location 124 of France (with no city specified), then the predicted location 158 of the country level 155 may be set to France, because the known location is a country-level location, while the predicted location 158 of the city level 155 may still be London.

In particular embodiments, a client system 130a may determine its own geographic location using, e.g., GPS signals, WIFI signals, or other suitable techniques. The geographic location of the client system 130a may be stored in a memory of the client system 130a as a true location 135a. The true location 135a may represent, e.g., the actual physical location of the client system 130a, or an approximation of the actual physical location. The true location 135a may include coordinates, e.g., a latitude and longitude, or other type of data representing of a location. The true location 135a of the client system 130a may be unavailable to other computing devices such as the servers 162 of the online services, e.g., because the client system 130a does not send the true location 135a to the servers 162. The network address 131a of the client system 130a is, however, ordinarily available to the servers 162, as are the network addresses 131b and true locations 135b of other client systems 130b that do send their true locations 135b to the servers 162. For example, applications 133, e.g., client applications of the social networking system 160, web browsers, or other applications executing on one or more of the other client systems 130b may send the true locations 135b to the servers 162 in network communications 136 (e.g., as data sent via the links 150 of the network 110).

Figures 1B, 2A:
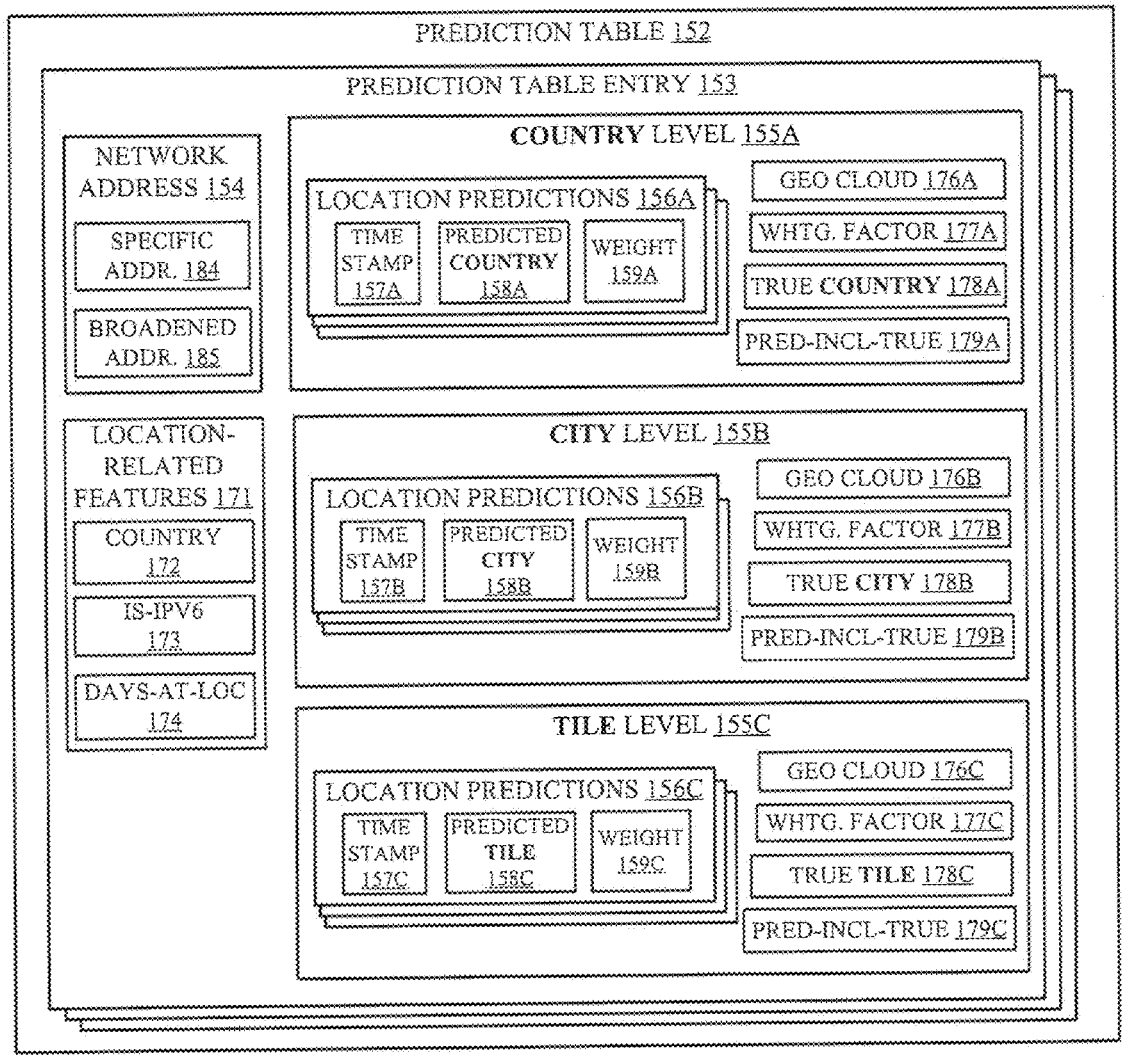
FIG. 1B illustrates an example prediction table entry that includes a plurality of granularity levels for which location predictions may be generated.
FIG. 2A illustrates an example location data table.

FIG. 1B illustrates an example prediction table entry 153 that includes a plurality of granularity levels 155A-C for which location predictions 156 and associated data 176-179 may be generated. One or more of the prediction table entries 153 in a prediction table 152 may include one or more granularity levels 155. The granularity levels shown in FIG. 1B include a country level 155A, a city level 155B, and a 05C. Location predictions 156A-C may be generated for each of the three granularity levels 155A-C. Each granularity level 155A-C may correspond to a particular level of geographic precision.

In particular embodiments, each location prediction 156A-C may include a predicted location 158 at a particular geographic granularity level 155. Each predicted location 158 may correspond to an identified geographic feature such as a city, country, tile, pair of latitude/longitude coordinates, or the like. The size of geographic features may be related to the granularity level 155A-C. For example, the feature size be smaller for higher granularities (e.g., higher zoom levels). For example, at the country level 155A, a country prediction 156A may include a predicted country 158A, which may be identified by name or other identifier, e.g., by latitude and longitude coordinates of the center or border of country. As another example, at the city level 155B, a city prediction 156B a may include a predicted city 158B, which may be identified by name or other identifier. As still another example, at the tile level 155C, a tile prediction 156C may include a predicted tile 158C, which may be identified by name or other identifier. Each predicted tile 158C of the tile level 155C may have an associated tile size.

In particular embodiments, each granularity level 155A-C may be understood as a map zoom level or resolution, and may have an associated tile size. The tile size may be, e.g., 800 meters by 800 meters, 75 meters by 75 meters, or other suitable size. The same tile size may be used for the tile level 155C, the city level 155B, and the country level 155A, or different tile sizes may be used for different granularity levels 155. In one example, if the tile sizes are different for different levels 155, then the tile size of the city level 155B may be larger (e.g., less detailed) than the tile size of the tile level 155C, and the tile size of the country level 155A may be larger than that of the city level 155B.

The illustrated granularity levels 155A-C are examples, and other granularity levels may be used alternatively or additionally. A single granularity level may be used, e.g., the city level 155B, in which case the prediction table entry 153 need not include other granularity levels such as the country level 155A and the tile level 155C. Other granularity levels may include, e.g., a region level, a zip code level, a world level, or any other suitable level. For example, the tile levels 155 may include country, region, city, zip, and tile levels, in increasing order of resolution.

Each granularity level 155 may include location predictions 156, a geo cloud 176, a weighting factor 177, a true location 178, and a predicted-includes-true indicator 179. The location predictions 156 of each level may include a time stamp 157, a predicted location 158, and a weight 159. The predicted location 158 and the true location 178 may be locations specified at a scale that corresponds to the granularity level 155. For example, the country level 155A may include country predictions 156A, each of which may include a time stamp 157A, a predicted country 158A, and a weight 159A. The country level 155 may also include a geo cloud 176A, a weighting factor 177A, a true country 178A, and a predicted-country-locations-includes-true-country indicator 179A. The city level 155B may include city predictions 156B, which may include a time stamp 157B, a predicted city 158B, and a weight 159B, as well as a geo cloud 176B, a weighting factor 177B, a true city 178B, and a predicted-city-locations-includes-true-city indicator 179A. The tile level 155C may include tile predictions 156C, which may include a time stamp 157C, a predicted tile 158C, and a weight 159C, as well as a geo cloud 176C, a weighting factor 177C, a true tile 178C, and a predicted-tile-locations-includes-true-tile indicator 179C.

In particular embodiments, each of the received known locations 124 may be at a particular granularity level, e.g., a neighborhood level (not shown), which may be more detailed than the tile level 155C. the detailed known locations 124 may be converted to less-detailed predicted locations 158. The neighborhood known locations 124 may be converted to a less-specific level, e.g., to the tile level 155C or to the city level 155B. This coarsening conversion may be performed by, e.g., changing the name of a neighborhood associated with the known location to the identifier of the tile in which the neighborhood is location, or by changing the name of the neighborhood to the name of the city. Coordinates may be coarsened by rounding latitude and longitude values to remove precision beyond that of the new tile level 155.

In particular embodiments, a query response 190 generated in response to a location query 140 may include location predictions 192 for multiple different granularity levels. For example, if the granularity levels 155 include a country level 155a, a city level 155b, and a tile level 155c, then the query response 190 may include location predictions 192 that identify the location predictions 192 as cities, countries, and tiles, e.g., predicted countries, cities, and tiles.

In particular embodiments, a location query 140 may specify one or more granularity levels for the location predictions 192. The query response 190 may include location predictions for each specified granularity level. For example, if a location query 140 requests locations at the city and tile level, then the query response 190 may include predicted cities and tiles.

FIG. 2A illustrates an example location data table 200. The table 200 includes known location data 120 and has three rows, each corresponding to a known location 124 of a network address 122. Each row includes the following columns: a network address, a network address type, a date, a time, a city, and a country. The network address column corresponds to the network address 122 of FIG. 1A. The network address may be an IPv4 address or an IPv6 address, as indicated by the address type column. The city, country, and tile columns correspond to the known location 124, and the date and time columns corresponds to the time stamp 128. The first row of table 200 specifies that the location of the IPv4 network address 128.1.1.1 is London, England, in tile 216C of FIG. 2A, as of 10:42 AM on 1/1/2018. The second row specifies that the location of the IPv4 network address 128.1.2.2 is Edinburgh, Scotland, in tile 204A of FIG. 2A, as of 12:01 PM on Jan. 1, 2018. The third row specifies that the location of the IPv6 network address 2607:fb90:6c1:9825:78b7:9ce5:9541:d195 is London, England, as of 3:56 PM on Jan. 1, 2018.

Although each known location 124 is represented by a row in the table 200 at three different levels (country, city, and tile), other examples may include fewer or more levels. Thus, in another example, the location may alternatively be specified as "London" without the country or tile. Further, the tile identifiers specify a location within the city, which is within the country, so the tile implicitly identifies the city and country. Thus, the city and country may be omitted from the database table 200 if desired (e.g., if the learning algorithm 180 can efficiently determine the city and country based on the tile). Other representations of the known location 124 are possible, e.g., latitude and longitude coordinates.

Figure 2B:
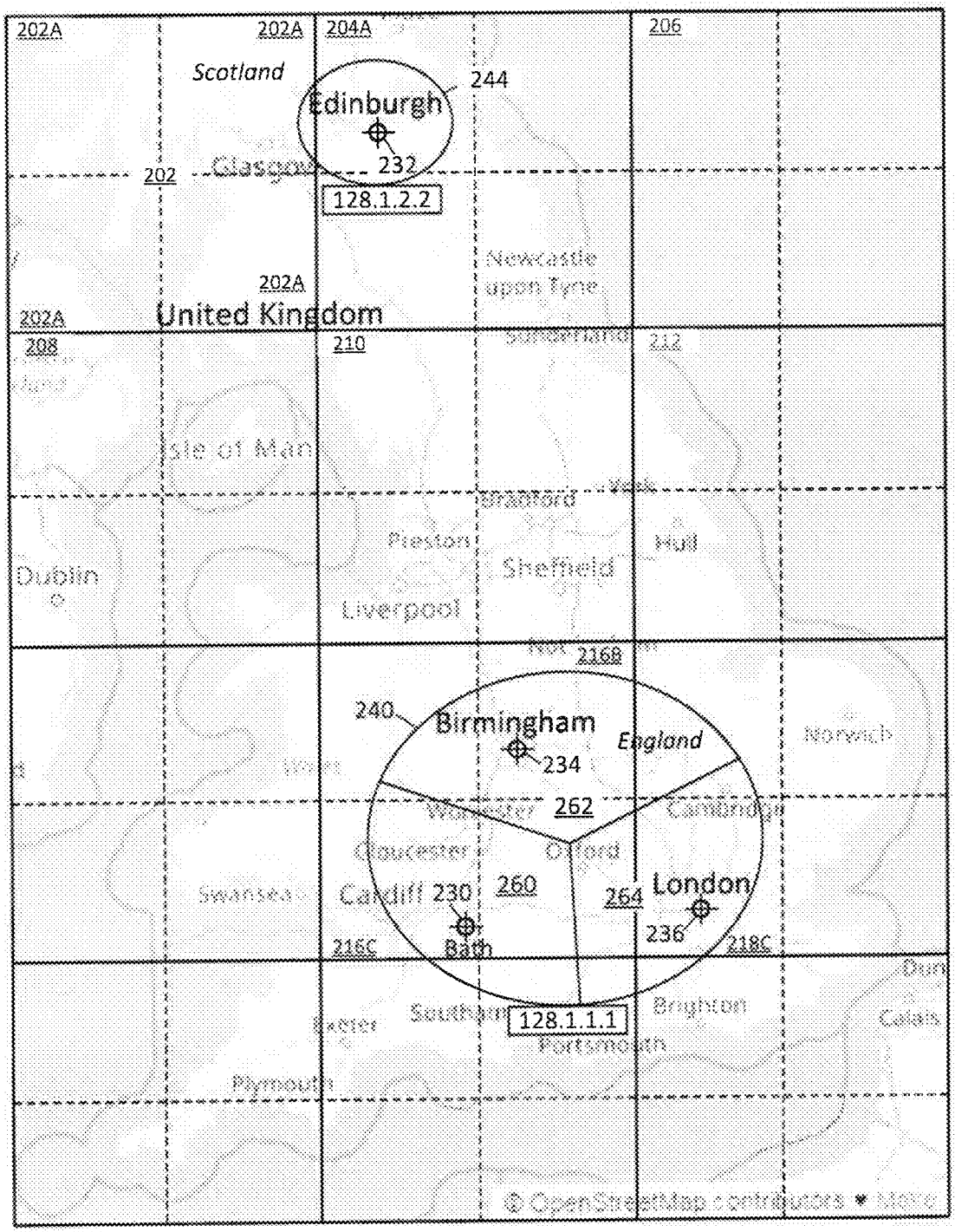
FIG. 2B illustrates example locations of computing devices on a geographic map at a country level.

FIG. 2B illustrates example locations 230-236 of computing devices on a geographic map 201 at a country level. The map 201 shows three countries: England, Scotland, and Ireland. FIG. 2B shows an example geo cloud 240 for the IP address 128.1.1.1. The geo cloud 240 includes cities 230 ("Bath"), 234 ("Birmingham"), and 236 ("London") in the country "England." The geo cloud 176 for a prediction table entry 153 may be a geographic region enclosed by a perimeter of any suitable shape. The region enclosed by the perimeter of the geo cloud 176 may include each of the predicted locations 157 of the network address 154 in the table entry 153. Each geo cloud may thus be associated with the prediction table entry 153 that corresponds to the network address 154 of the geo cloud 176. Each geo cloud 176 may be an oval-shaped, circular, or rectangular region that includes each of the predicted locations 157. Each of the predicted locations 157 in the geo cloud may be, e.g., a city or other type of location. Each geo cloud 176 may be divided into sub-regions corresponding to the individual predicted locations 157. For example, the geo cloud 240 is divided into sub-regions 260, 262, 264 corresponding to the locations 230, 234, 236, respectively. In particular embodiments, any location in a particular geographic sub-region may correspond to the predicted location 158 of that sub-region. When determining whether a predicted location 158 includes a true location 178, the true location 178 may be determined to be correspond to, e.g., be included in a predicted location 158 if the sub-region associated with the predicted location 158 includes the true location 158. Thus, the predicted location may correspond to the true location of the network address when the predicted location is in a geographic sub-region associated with the true location, and the sub-region is in a geographic region associated with the network address. Alternatively or additionally, a predicted location may correspond to a true location of a network address when the predicted location is less than a threshold distance from the true location, e.g., less than 10 meters, less than 50 meters, less than 150 meters, or the like. The threshold distance may be proportional to the geographic granularity associated with the predicted location, e.g., less than 10 meters for a fine granularity such as a neighborhood level or tile level, 150 meters for a medium granularity such as a city level, or 1000 meters for a coarse granularity, such as a country level.

The number of sub-regions in a geo cloud 176 may depend on the number of different known locations 124 detected for a network address 122, and on how much time each location prediction 156 remains in the prediction table entry prior to being deleted or otherwise excluded from computations because of, for example, a weight 158 decaying to a sufficiently small value or the prediction being sufficiently old. A prediction may be deleted from the set of location predictions 156 when its weight falls below a threshold value, e.g., 0.01 or 0.001, or the like, or when its age exceeds a threshold, e.g., when its time stamp 157 is sufficiently far in the past, e.g., greater than 20 days, greater than 1 month, greater than 3 months, greater than 1 year, or the like. Alternatively or additionally, the number of sub-regions may be limited to at least a threshold number K, e.g., 20, 30, 50, 100, or the like, and the sub-regions having the K highest weights 158 may be retained, while the sub-regions having weights less than the K-th highest weight may be deleted or otherwise excluded from computations.

Referring to the map 201 of FIG. 2B, geographic locations may be identified by their names (e.g., "Bath"), or by other appropriate identifiers, such as their geographic coordinates (e.g., latitude and longitude pairs). Each geographic location may be associated with a network address of a corresponding client system 130. For example, the locations 230, 234, and 236 are associated with IP address 128.1.1.1 and the location 232 is associated with an IP address 128.1.2.2. Each location may also be associated with a time stamp, such as a date and time. Different locations of a particular computing device are ordinarily associated with different time stamps. Since a device should not be in two different locations at the same time, different recorded locations of the same device at the same time (or at times within a threshold difference of each other) may indicate an error or deliberate falsification of the IP address.

In particular embodiments, a geo cloud 240 may include one or more device locations 230, 234, 236 associated with a particular network address 128.1.1.1. Different network addresses may correspond to different geo clouds. The network address 128.1.2.2 thus corresponds to a geo cloud 244. A geo cloud may be understood as a geographic region that includes the locations at which a network address has been identified. A geo cloud may be divided into sub-regions, so that each sub-region contains one of the device locations associated with the cloud. Sub-regions may be divided by straight lines as shown, or by lines of any appropriate shape. The sub-regions of a geo cloud may be approximately equal in area (e.g., to within a threshold difference in area). Optionally, the area of sub-regions may include land area but not water area for the purposes of dividing a geo cloud into sub-regions. For example, in the geo cloud 240, the location 234 ("Birmingham") is in a first sub-region 260 that covers the upper half of the cloud area, the location 230 ("Bath") is in a second sub-region 262 that covers the lower left quarter of the cloud area, and the location 236 ("London") is in a third sub-region 264 that covers the lower right quarter of the cloud area. In particular embodiments, there may be a correspondence between locations within a sub-region (e.g., 260) and the device location (e.g., 234) contained in the sub-region. For example, any location within a sub-region may be mapped to the device location contained in the sub-region for purposes of training and prediction.

As an example, for the IP address 128.1.1.1, initial weights for three cities in the example above may be Bath=0.6, Birmingham=0.1, London=0.3 to indicate that the IP address is likely to be in Bath with a probability of 0.6, in Birmingham with a probability of 0.1, or in London with a probability of 0.3. In particular embodiments, the predicted location of an IP address may include any location within the sub-region associated with the IP address's predicted location, even if the sub-region is larger than the geographic feature identified by the predicted location. For example, for a predicted location that identifies a city, such as Bath 230, that is in a sub-region 260, the predicted location may be any location within the sub-region 260 (with the probability specified by the associated weight). In this example, according to the boundaries of the geo cloud 240, the IP address 128.1.1.1 is predicted to be located in Bath's sub-region 260 with a probability of 0.6, in Birmingham's sub-region 262 with a probability of 0.1, or in London's sub-region with a probability of 0.3.

In particular embodiments, a geo cloud 240 may be, for example, an area enclosed by the device locations 230, 234, 236 associated with a network address. For example, a geographic region may be a bounding box or other shape such as a polygon or curved shape includes the locations associated with the IP address. In particular embodiments, the geographic region may be a minimal bounding box of the locations associated with the network address. Alternatively, the geographic region may be a shape, such as a circle, oval, polygon, or other appropriate shape, that encloses the locations of the network address such that there is at most a threshold maximum distance between the location of each network address in the shape and the perimeter of the shape.

In the example of FIG. 2B, the map 201 is divided into 12 large tiles 202-224. Each tile is divided into sub-tiles. Each large tile is identified by a numeric reference number, and the large tile's sub-tiles are identified by the numeric reference number followed by a letter A, B, C, or D. The large tiles are divided by solid lines, and each large tile is divided into sub-tiles by dashed lines. For example, tile 202 is divided into sub-tiles 202A, 202B, 202C, 202D. The large tiles may correspond to a first geographic granularity level and the small tiles may correspond to a second geographic granularity level in which the small tiles are increments that are smaller but more densely arranged than those of the first granularity level. Note that although FIG. 2B illustrates map tiles of particular sizes, this disclosure contemplates map tiles of any suitable sizes. For example, the map tiles could be of differing sizes based on object density, as described in U.S. Pat. No. 8,914,393, issued on 16 Dec. 2014, which is incorporated by reference herein.

Figure 2C:
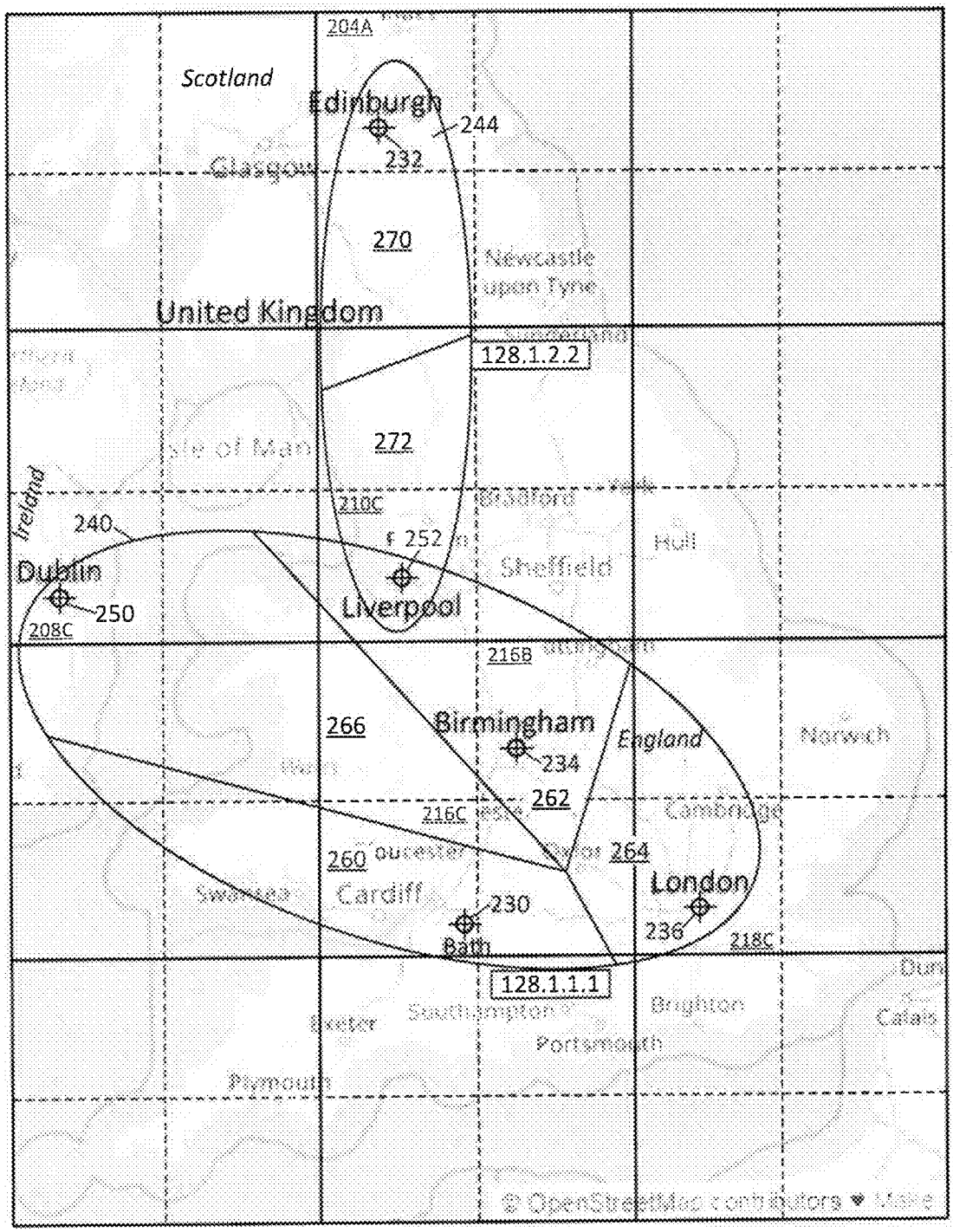
FIG. 2C illustrates additional example locations of computing devices on a map at a country level.

FIG. 2C illustrates additional example locations 250, 252 of computing devices on a map 202 at a country level. The additional locations 250, 252 may have been received as known locations 120 subsequently to those shown in FIG. 2B, e.g., in location updates, which may be in the form of messages received via communication network 110. The location updates may be referred to herein as "ping" messages. The first additional location 250 ("Dublin") is associated with the IP address 128.1.1.1 and is thus included in the geo cloud 240 of that address. For example, the area included in the cloud 240 may be expanded to include the additional location 238. Since the location 250 ("Dublin") is associated with the same IP address as the geo cloud 240, the geo cloud 240 is expanded to include the location 250 ("Dublin"). An additional sub-region 266 containing the location 250 is added to the geo cloud 240, and the other sub-regions 230, 234, 236 are re-sized to so that the areas of the four regions in the geo cloud 240 are approximately equal.

The second additional location 252 ("Liverpool") is associated with the IP address 128.1.2.2. Since the location 252 ("Liverpool") is associated with the same IP address as the geo cloud 244, the geo cloud 244 is expanded to include the location 252 ("Liverpool"). The geo cloud 244 now contains more than one device location and is thus divided into sub-regions 270 (containing location 232) and 272 (containing location 252). The expanded geo clouds 240, 244 overlap, but since the clouds 240, 244 are for separate IP addresses, each cloud may be processed independently of other overlapping clouds. The location 252 is also within the perimeter of the geo cloud 240 but is associated with a different IP address ("128.1.2.2"), and thus is not included as a predicted location in the geo cloud 240.

Figure 2D:
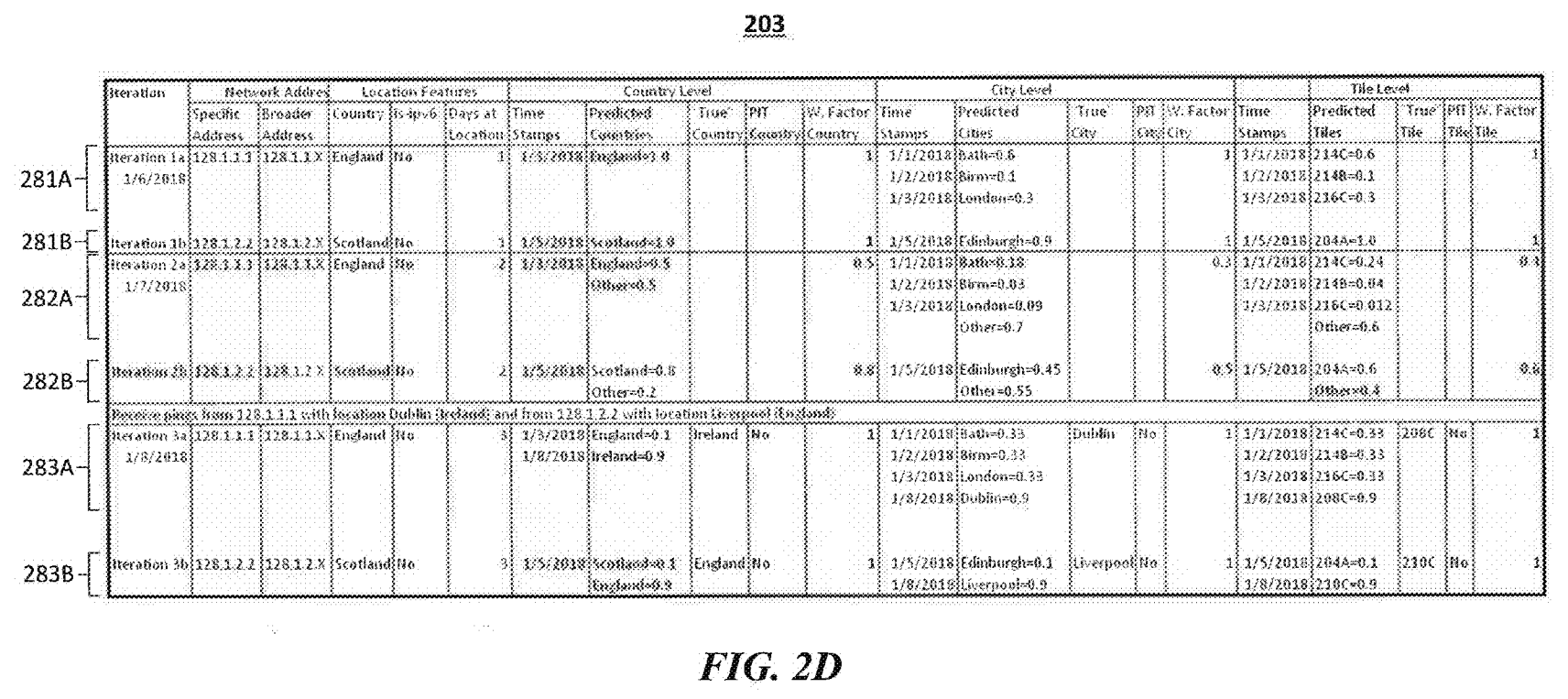

FIG. 2D illustrates an example prediction table 203 that includes location predictions generated for the example network addresses and locations shown in FIGS. 2B and 2C. The prediction table 203 includes rows 281-283, which may correspond to the prediction table entries 153 of FIG. 1A. The prediction table 203 may be generated by, for example, the prediction algorithm 180 using the initial known location data shown in the table 200 of FIG. 2A. The prediction table 203 includes columns corresponding to the location predictions 156, true location 178, predicted-includes-true 179, and weighting factor 177 of FIG. 1A. The corresponding columns in the table 203 are as follows: Network Address columns, which include a Specific Address and a Broader Address, Location Features columns, which include Country, is-ipv6, and Days at Location columns, and location prediction columns for Country Level, City Level, and Tile Level geographic granularity levels. Each of these levels may include the following columns (where "location" is one of Country, City, or Tile): Time Stamps, Predicted Location, True Location, predicted-includes-true ("PIT") location (indicating whether the predicted location includes the true location), and W. Factor (weighting factor) for the location.

In particular embodiments, each iteration of the learning algorithm 180 may generate a row in the prediction table 203 for each specific address that has a known location. Initially, e.g., at the first iteration, the specific addresses may be retrieved from the initial known locations table 200 shown in FIG. 2A. In this example, the specific addresses 128.1.1.1 and 128.1.2.2 are retrieved from the table 200. The corresponding initial known locations from the table 200 are London, England, tile 216C for 128.1.1.1 and Edinburgh, Scotland, tile 204A for 128.1.2.2. These locations may be used as the initial predicted countries, cities, and tiles, respectively, in the table 203. Each example iteration may generate a row in the table 203 for the network address 128.1.1.1 and a row for the network address 128.1.2.2. For example, the first iteration generates row 281A for 128.1.1.1 and row 281B for 128.1.2.2. Subsequent iterations may update or replace the rows 281A, 281B.

A row 218A labeled "Iteration 1a" is generated on Jan. 6, 2018 for the address 128.1.1.1. The row 218A includes an optional Broader Address value=128.1.1.X. The Broader Address may be specified by configuration parameters or other configuration data source that may be separate from the learning algorithm 180. The Broader Address 128.1.1.X specifies that the location prediction information, e.g., the predicted countries, in row 281A may be used for any address having 128, 1, and 1 as the first three octets. Row 281A also includes the following Location Features: Country=England, is-ipv6=No, and Days at Location=1. Rows 281A and 281B include initial weighting factor values for the three location types (country, city, and tile) having the value 1.0, which may be a default value. The initial weighting factor values may alternatively or additionally be determined by the learning algorithm 180 based on the location features and the ages of the predicted locations.

Row 281A further includes columns for location predictions at three granularity levels: Country Level, City Level, and Tile Level. The Country Level columns include a Time Stamp=1/3/2018 and Predicted Countries=(England=1.0), which represent a location prediction based on location information dated Jan. 3, 2018. For example, the information may be based on known locations received on Jan. 3, 2018. The Predicted Country "England" may be determined based on the initial known locations from the table 200 of FIG. 2A, which indicate that address 128.1.1.1 is located in London, England. Row 281A does not have values for the True Country or the predicted-includes-true ("PIT") country columns because a recent value of the true country of address 128.1.1.1 is not known when the row is generated (on Jan. 6, 2018). A recent value may be, e.g., a value less than a threshold number of hours old, such as less than 1, 5, or 24 hours old).

The City Level columns in row 281A include Predicted Cities Bath=0.6, Birmingham=0.1, London=0.3. That is, the weight of Bath is 0.6, the weight of Birmingham is 0.1, and the weight of London is 0.3. The Predicted City "London" may have been identified based on the initial known locations from the table 200 of FIG. 2A, which indicate that address 128.1.1.1 is located in London. The Predicted Cities Bath and Birmingham may have been identified based on other initial known locations in the table 200. The weights, 0.6, 0.1, and 0.3 of the cities Bath, Birmingham, and London, respectively, may be determined by the learning algorithm 180 based on information not shown, e.g., ping messages previously received, such as a ping containing address 128.1.1.1 and location Bath, and another ping containing address 128.1.1.1 and location Birmingham.

The Tile Level columns in row 281A include Predicted Tiles 214C=0.6, 214B=0.1, 216C=0.3. These tiles are shown on the map 201 of FIG. 2B and include the locations of the cities Bath, Birmingham, and London, respectively. The predicted tile 216C may be determined based on the initial known locations from the table 200, which indicate that address 128.1.1.1 is in tile 216C. Other predicted tiles may be determined based on previously-received ping messages, such as a ping containing address 128.1.1.1 and tile 214B, and another ping containing address 1281.1.1 and tile 214C. Alternatively, the Predicted Tiles may be determined based on the Predicted Cities or vice-versa. For example, the Predicted Cities may be determined as cities that include the Predicted Tiles, or the Predicted Tiles may be determined as tiles that include the Predicted Cities. The weights may sum to 1.0 or other suitable value. If previous values of the weights are available, the weighting factor may be multiplied by the previous values to determine updated values of the Tile Level weights.

Row 281B is labeled "Iteration 1b" and was generated on Jan. 6, 2018 for the Specific Address 128.1.2.2. Row 281B includes an optional Broader Address value, which is 128.1.2.X in this example. The Broader Address 128.1.2.X specifies that the location prediction information, e.g., the predicted countries, cities, and tiles in row 281B may be used for any address having 128, 1, and 2 as the first three octets. Row 281B also includes the following Location Features: Country=Scotland, is-ipv6=No, and Days at Location=1.

Row 281B further includes example columns for Country Level, City Level, and Tile Level location predictions. The example Country Level columns include a Time Stamp=1/5/2018 and Predicted Countries Scotland 1.0. The country Scotland in row 281B may have been determined based on the initial known locations from the table 200. The weight 1.0 may be an initial value or may be otherwise determined by the learning algorithm 180. In particular embodiments, confidence in the accuracy of the predicted country Scotland may be high when the data specifying the location has recently been received, and may decrease as time passes without receiving further data specifying the location. In row 281B, the date associated with Iteration 1b, 1/6/2018 (in the Iteration column), indicates that the row was generated on Jan. 6, 2018, which is one day after the row's time stamp of 1/5/2018.

The example City Level columns in row 281B include Predicted Cities Edinburgh=1.0, indicating 100% confidence that address 128.1.2.2 is located in Edinburgh as of the time and date row 281B is generated (1/6/2018). The city Edinburgh may have been identified based on the initial known locations from the table 200, which indicate that address 128.1.2.2 is located in Edinburgh, Scotland. The example Tile Level columns in row 281B include Predicted Tiles 204A=1.0. As shown on the map 201, tile 204A includes the city Edinburgh. The Predicted Tile 204A may be identified based on the initial known locations from the table 200, which indicate that address 128.1.2.2 is located in tile 204A.

A row 282A labeled "Iteration 2a" is generated on Jan. 7, 2018 for the address 128.1.1.1. The row 282A is similar to row 281A but has an incremented Days at Location value of 2 and updated location predictions. The learning algorithm 180 determines updated weighting factors for row 282A. Each weighting factor may be based on the age of the predicted location, e.g., the age of the data that was most recently used to add England to the Predicted Countries.

The time stamps associated with the predictions in row 282A have the same values as the time stamps in row 281A, because the predicted countries, cities, and tiles have not changed since row 281A was generated. The predictions have aged by one day, however. For example, at the country level, since England is identified from the initial known locations table 200, and the table 200 has a date and time of 1/1/2018 and 10:42 PM associated with England, the age of the data may be calculated by subtracting the date and time shown in the table 200 from the time at which the row 282A is generated (e.g., on Jan. 7, 2018). The weight of England may be reduced by an amount proportional to the age of the data.

In particular embodiments, the weighting factor of each location prediction may be determined by the learning algorithm 180 based on the location features and the ages of the weights associated with the predicted location. The weighting factor may then be multiplied by previous values of the weights to determine new values of the weights. In row 282A, the learning algorithm 180 has set the Country-level weighting factor to 0.5, and the weight of England has been determined by multiplying the weight from the previous iteration (1.0) by the weighting factor (0.5) to produce an updated weight of 0.5 for England. Since the weight of England has been reduced, an "Other" country has been added to the predicted countries to represent countries other than England. The weight of the "Other" country may be determined by subtracting the weight of England from 1.0. The resulting weight 0.5 is associated with the "Other" country and indicates a 50% likelihood that address 128.1.1.1 is located in a country other than England. Thus, in the Country Level columns, Predicted Countries is set to England=0.5, Other=0.5.

In row 282A, the city-level weighting factor has been reduced to 0.3, which is less than the country-level weighting factor of 0.5. The weighting factor 0.3 may have been determined by the learning algorithm 180 based further on the location features and the ages of the data from which the predicted cities were identified, for example. The city-level factor has been reduced further than the country-level factor because the network address is more likely to move between cities than between countries, which are larger than cities. Thus, the predicted city is less likely to remain accurate than is the predicted country as time passes.

The updated city weights, Bath=0.18, Birmingham=0.03, and London=0.09, may be determined by multiplying the previous weights, 0.6, 0.1, and 0.3, by the city weighting factor 0.3. An "Other" weight representing any city other than the predicted cities (Bath, Birmingham, and London) has been introduced to represent the weight deducted from the predicted cities. The "Other" weight may be determined as the difference between 1.0 and the sum of the updated weights, e.g., 1.0−0.5=0.7. The "Other" weight 0.7 associated with the "Other" city name indicates a 70% likelihood that address 128.1.1.1 is located in a city different from the predicted three cities.

Row 282A also includes an updated Tile Level weighting factor=0.4. The tile-level factor has been reduced further than the country-level factor because the network address is more likely to move between tiles than between countries, which are larger than tiles. However, the tiles shown in FIG. 2A are larger than cities, so the tile-level factor is greater than the city-level factor. Thus, the predicted tile is less likely to remain accurate than the predicted country as time passes, but more likely to remain accurate than the predicted city. The Tile Level weighting factor has been reduced by a greater amount than the City Level weighting factor because the network address is more likely to move between cities than tiles, which are larger than cities in FIG. 2A. The weights of the Predicted Tiles, including the weight of the "Other" tile, may be calculated as described above for the Predicted Cities of row 282A. Multiplying the weighting factor 0.4 by the previous weights 0.6, 0.1, 0.3, the Predicted Tiles columns in row 282A have the weights 214C=0.24, 214B=0.04, 216C=0.012, Other=0.6.

A row 282B labeled "Iteration 2b" is generated on Jan. 7, 2018 for address 128.1.2.2. The row 282B is similar to row 281B, but has Predicted Countries Scotland=0.8, Other=0.2. These weights may be generated based on the Country weighting factor 0.8, e.g., by multiplying the weight of Scotland (1.0) from the previous iteration (row 281B) by 0.8. The Country weighting factor 0.8 may be generated by the learning algorithm 180 as described above. The weight of the Scotland prediction is reduced to 0.8, and an "Other" prediction has been included in the Predicted Countries with a weight of 0.2. The "Other" weight 0.2 may be determined by subtracting the reduced Scotland weight (0.8) from the maximum weight (1.0 in this example). Further, the city-level weights change to Edinburgh=0.45, Other=0.55 as a result of multiplying the previous city-level weights by the city correction factor 0.5. Still further, the tile-level weights change to 204A=0.6, Other=0.4 as a result of multiplying the previous tile-level weights by the tile correction factor 0.6.

Subsequent to Iteration 2b, on Jan. 8, 2018, a ping message is received from network address 128.1.1.1 with associated location Dublin, Ireland, and another ping message is received from network address 128.1.2.2 with associated location Liverpool, England. These ping messages correspond to additional known location data 120, and may be used to update the predictions in the table 203 as described below. Iteration 3 begins at row 283A. Iteration 3, which generates rows 283A and 283B, may begin on the next day after Iteration 2, or at another suitable time, which may be based on any suitable time period between iterations. Alternatively, iteration 3 may begin in response to receiving the ping messages. The ping messages may be received asynchronously, e.g., at any time, and the next iteration (e.g., iteration 3) may begin in response to receiving one or more (e.g., at least a threshold number) of ping messages.

Row 283A, which corresponds to address 128.1.1.1, is labeled "Iteration 3a" and is generated on Jan. 8, 2018. The Days at Location value has increased to 3, and the Country Level, City Level, and Tile Level predictions have been updated based on the ping message received from 128.1.1.1. The ping message indicates that the address's current location is Dublin, Ireland, as shown in FIG. 2C. The location of Dublin, Ireland is accordingly added to the location predictions as follows. The country Ireland is added to the Country Predictions with a Time Stamp of 1/8/2018, which is the time at which the ping message was received. Since the updated location reported by the ping message is recent (e.g., less than a threshold number of hours old, e.g., less than 24 hours old), the Country weighting factor may be reset to 1, and the location indicated in the ping may be added to the set of predicted locations with a weight of 0.9. Alternatively, a weight of 1.0 or other value may be used. The weight of 0.9 (or other weight less than 1.0) may be used to allow the previously-identified predicted locations to remain in the set with reduced weights (which may be in proportion to their previous weights). Thus, the weight of Ireland is 0.9, and the remaining weight of 0.1 is divided among the previously-identified predicted locations. The "Other" location may be removed from the set, since the location is indicated by the ping message with high probability (because it is a recent location, e.g., received less than a threshold number of minutes in the past, such as less than 1 minute, 5 minutes, 10 minutes, or the like).

Alternatively, the "Other" location may be retained in the set of predicted locations and may be allocated a reduced weight. In the example of row 283A, the resulting Predicted Countries are (England=0.1, Ireland=0.9), and the weighting factor has been reset to 1. In other examples, the weighting factor may be increased to a different value, e.g., to 0.9, or may be unchanged in response to the ping containing the updated location. Since the ping indicates a recent location (e.g., received less than the threshold number of minutes in the past), the True Country column may be set to the country indicated in the ping message, e.g., Ireland in this example. Further, the predicted-includes-true country (PIT) indicator may be set to No, since the set of predicted countries (England) did not include Ireland.

The City Predictions in row 283A may be updated similarly to the Country Predictions described above. The city Dublin is added to the City Predictions with a Time Stamp of 1/8/2018. The City weighting factor may be reset to 1, and the location indicated in the ping may be added to the set of Predicted Cities with a weight of 0.9. Alternatively, a weight of 1.0 or other value may be used. Thus, the weight of Dublin is 0.9, and the remaining weight of 0.1 is divided among the previous Predicted Cities. Bath, Birmingham and London are thus each assigned a weight of 0.33. Since the ping indicates a recent location (e.g., received less than the threshold number of minutes in the past), the True City column may be set to Dublin. The predicted-includes-true city (PIT) indicator may be set to No, since the set of predicted cities (Bath, Birmingham, London) did not include Dublin.

The Tile Predictions in row 283A may be updated similarly to the Country Predictions described above. The tile 208C in which Dublin is located is added to the Tile Predictions with a Time Stamp of 1/8/2018. The tile weighting factor may be reset to 1, and the tile indicated in the ping may be added to the set of Predicted Tiles with a weight of 0.9. Alternatively, a weight of 1.0 or other value may be used, and different weights may be used for different geographic levels). Thus, the weight of tile 208C is 0.9, and the remaining weight of 0.1 is divided among the previous Predicted Tiles. Tiles 214C, 214B, and 216C are thus each assigned a weight of 0.33. Since the ping indicates a recent location (e.g., received less than the threshold number of minutes in the past), the True Tile column may be set to 208C. The predicted-includes-true tile (PIT) indicator may be set to No, since the set of predicted tiles (214C, 214B, 216C) did not include tile 208C.

Row 283B, which corresponds to address 128.1.2.2, is labeled "Iteration 3b" and is generated on Jan. 8, 2018. The location predictions for address 128.1.2.2 are been updated based on the ping message received from 128.1.2.2. The ping message indicates that the address's current location is Liverpool, England, as shown in FIG. 2C. The location of Liverpool, England is accordingly added to the location predictions as described above. The country England is added to the Country Predictions with a Time Stamp of 1/8/2018, which is the time at which the ping message was received. Since the updated location reported by the ping message is recent, the Country weighting factor may be reset to 1, and the location indicated in the ping may be added to the set of predicted locations with a weight of 0.9. Thus, the weight of England is 0.9, and the remaining weight of 0.1 is allocated to the previously-predicted country Scotland. The "Other" location may be removed from the set, as described above. In the example of row 283B, the resulting Predicted Countries are Scotland=0.1, England=0.9, and the weighting factor has been reset to 1. Since the ping indicates a recent location, the True Country column may be set to the country indicated in the ping message, e.g., England in this example. Further, the predicted-includes-true country (PIT) indicator may be set to No, since the set of predicted countries (Scotland) did not include England. The example City Predictions in row 283B may be updated similarly to the Country Predictions. The resulting Predicted Cities are Edinburgh=0.1, Liverpool=0.9. The Tile Predictions in row 283B may be updated similarly to the Country Predictions described above. The resulting Predicted Tiles are 204A=0.1, 210C=0.9.

In particular embodiments, a query submitted on Jan. 9, 2018 to predict the location of 128.1.1.5 (which matches 128.1.1.X) may return Country=(England=0.1, Ireland=0.9), City=(Bath=0.33, Birmingham=0.33, London=0.33, Dublin=0.9), Tile=(214C=0.33, 214B=0.33, 216C=0.33, 208C=0.9). As another example, a query submitted on Jan. 9, 2018 to predict the location of 128.1.2.2 may return Country=(Scotland=0.1, England=0.9), City=(Edinburgh=0.1, Liverpool=0.9), Tile=(204A=0.1, 210C=0.9).

Figure 3:
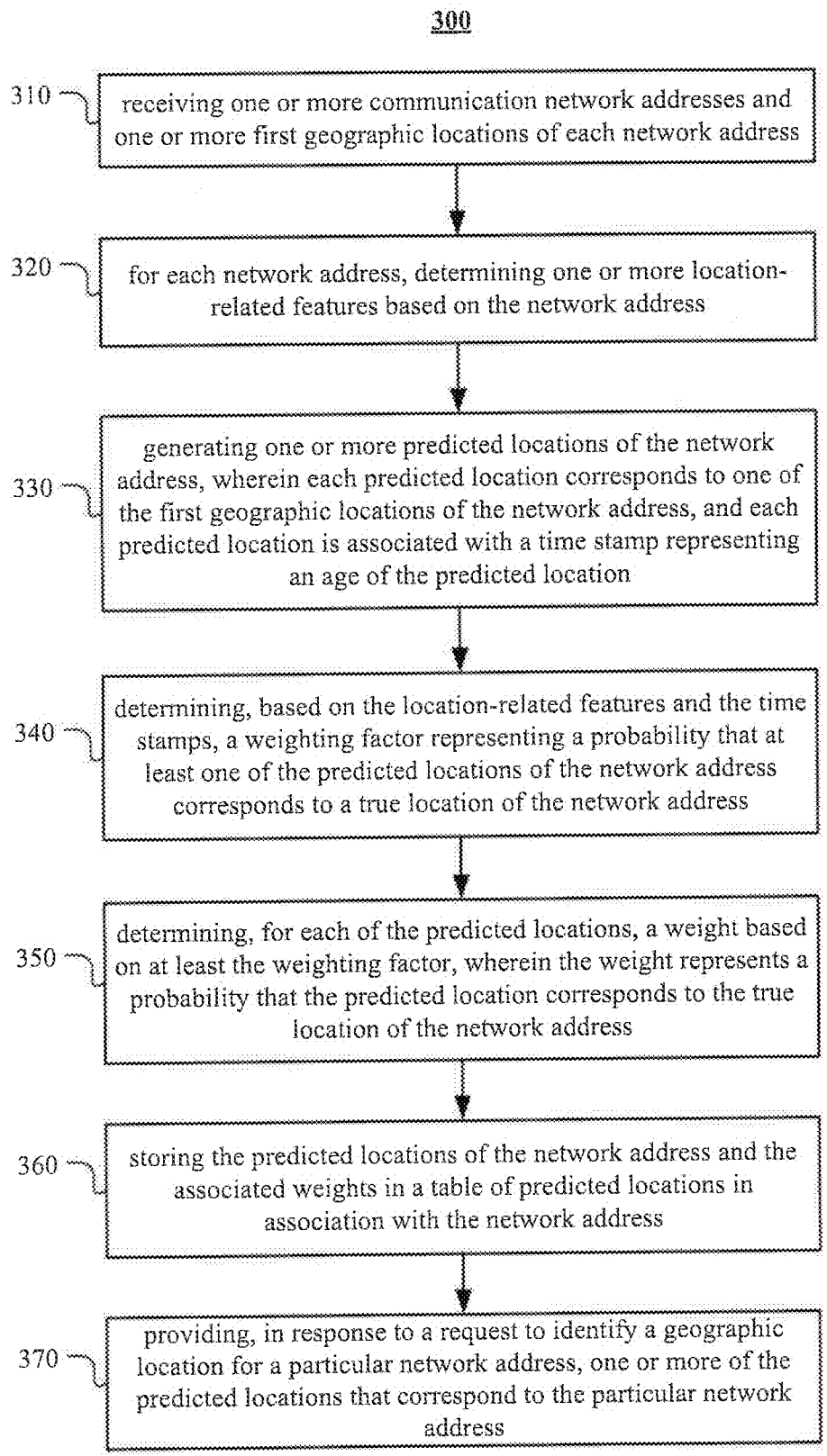
FIG. 3 illustrates an example method for predicting locations of client systems.

FIG. 3 illustrates an example method 300 for predicting locations of client systems. The method 300 may be performed by, e.g., computer program code that executes on a server 162. The method 300 may begin at step 310 by receiving one or more communication network addresses and one or more first geographic locations of each network address. Each network address may be an Internet Protocol (IP) address, e.g., an IPv4 address or an IPv6 address. Step 320 may, for each network address, determine one or more location-related features based on the network address.

Step 330 may generate one or more predicted locations of the network address, wherein each predicted location corresponds to one of the first geographic locations of the network address, and each predicted location is associated with a time stamp representing an age of the predicted location. Generating the plurality of predicted locations of the network address may be performed for up to a threshold number of network addresses, e.g., 1000, 2000, 10000, or other suitable number of network addresses. For example, the generated set of predicted location may be, e.g., 1000 to 2000 prediction table entries 153. This output set may be applied to other network addresses, e.g., a larger number of network addresses.

Step 340 may determine, based on the location-related features and the time stamps, a weighting factor representing a probability that at least one of the predicted locations of the network address corresponds to a true location of the network address. The weighting factor may be determined by a machine-learning model based on the location-related features.

Step 350 may determine, for each of the predicted locations, a weight based on at least the weighting factor, wherein the weight represents a probability that the predicted location corresponds to the true location of the network address. The machine-learning model may learn the weighting factor based on the location-related features. The location-related features may include a country, a network protocol type, and/or a number of days at a current location. The location-related features may include an indication of whether at least one of the predicted locations corresponds to a true location of the network address. Step 360 may store the predicted locations of the network address and the associated weights in the table of predicted locations in association with the network address. Step 370 may provide, in response to a request to identify a geographic location for a particular network address, one or more of the predicted locations that correspond to the particular network address.

Figure 4:
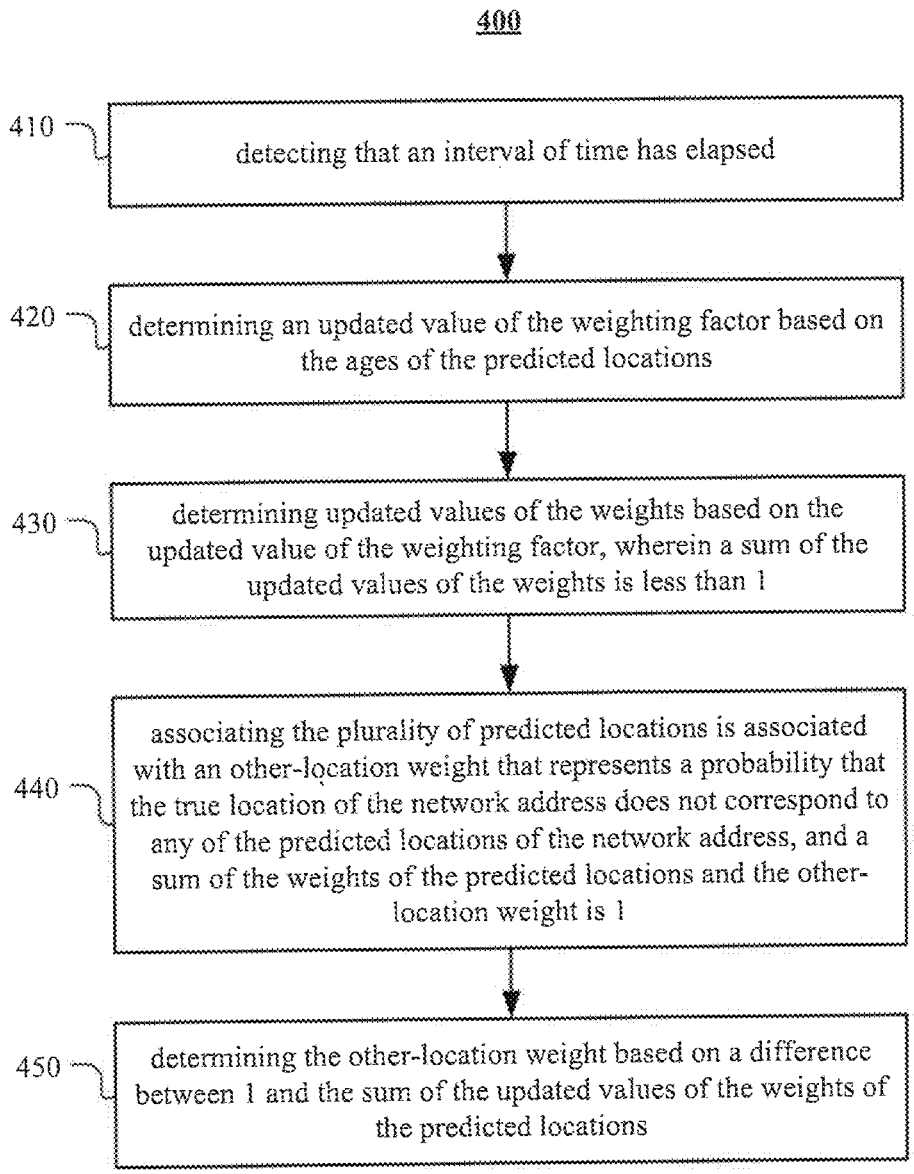
FIG. 4 illustrates an example method for updating location predictions based on passage of time.

FIG. 4 illustrates an example method 400 for updating location predictions based on passage of time. The method 400 may be performed by, e.g., computer program code that executes on a server 162. The method 400 may begin at step 410 by detecting that an interval of time has elapsed. Step 420 may determine an updated value of the weighting factor based on the ages of the predicted locations. Step 430 may determine updated values of the weights based on the updated value of the weighting factor, wherein a sum of the updated values of the weights is less than 1. Step 440 may associate the plurality of predicted locations is associated with an other-location weight that represents a probability that the true location of the network address does not correspond to any of the predicted locations of the network address, and a sum of the weights of the predicted locations and the other-location weight is 1. Step 450 may determine the other-location weight based on a difference between 1 and the sum of the updated values of the weights of the predicted locations.

Figure 5:
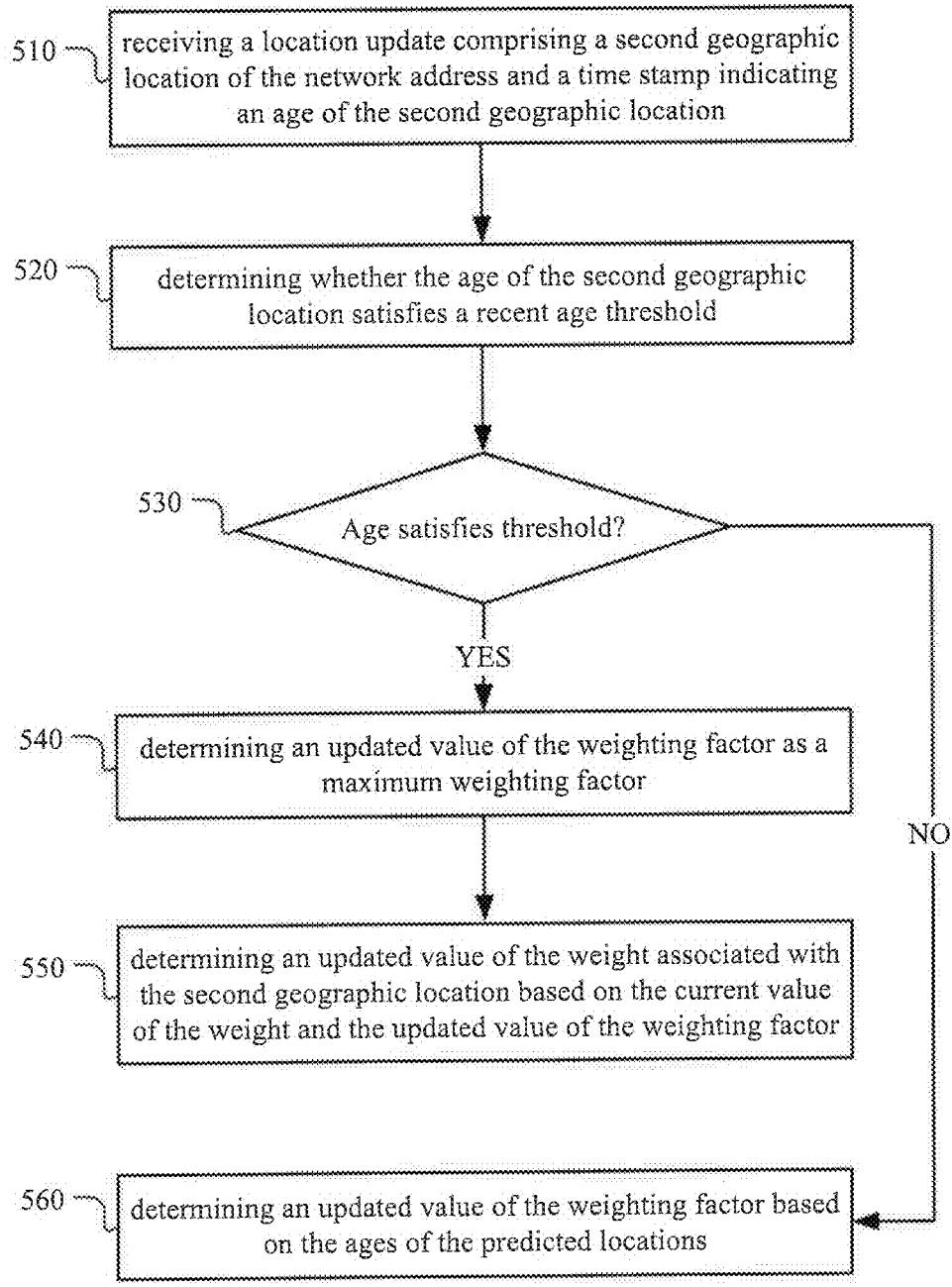
FIG. 5 illustrates an example method for updating location predictions in response to receiving location update data.

FIG. 5 illustrates an example method 500 for updating location predictions in response to receiving location update data. The method 500 may be performed by, e.g., computer program code that executes on a server 162. The method 500 may begin at step 510 by receiving a location update comprising a second geographic location of the network address and a time stamp indicating an age of the second geographic location. Step 520 may determine whether the age of the second geographic location satisfies a recent age threshold. Step 530 may invoke step 540 if the age satisfies the threshold, or step 560 if the age does not satisfy the threshold. Step 540 may determine an updated value of the weighting factor as a maximum weighting factor. Step 550, if invoked, may determine an updated value of the weight associated with the second geographic location based on the current value of the weight and the updated value of the weighting factor, after which the method 500 may end. Step 560, if invoked, may determine an updated value of the weighting factor based on the ages of the predicted locations.

Figure 6:
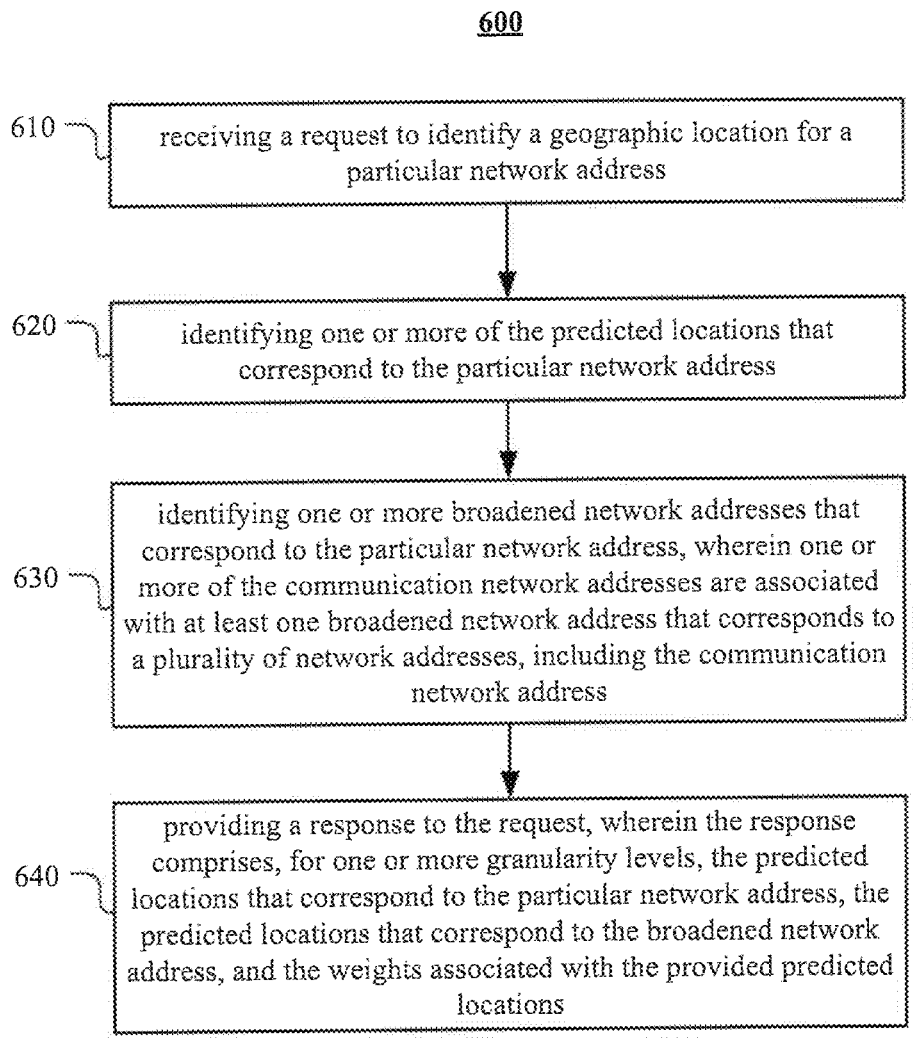
FIG. 6 illustrates an example method for processing requests to identify locations of specified network addresses.

FIG. 6 illustrates an example method 600 for processing requests to identify locations of specified network addresses. The method 600 may be performed by, e.g., computer program code that executes on a server 162. The method 600 may begin at step 610 by receiving a request to identify a geographic location for a particular network address. Step 620 may identify one or more of the predicted locations that correspond to the particular network address. The predicted locations may be identified by searching the table for a prediction table entry that includes the particular network address, and retrieving the predicted locations from the prediction table entry. Step 630 may identify one or more broadened addresses that correspond to the particular network address, wherein one or more of the communication network addresses are associated with at least one broadened address that corresponds to a plurality of network addresses, including the communication network address. Step 640 may provide a response to the request, wherein the response comprises, for one or more granularity levels, the predicted locations that correspond to the particular network address, the predicted locations that correspond to the broadened address, and the weights associated with the provided predicted locations.

Figure 7:
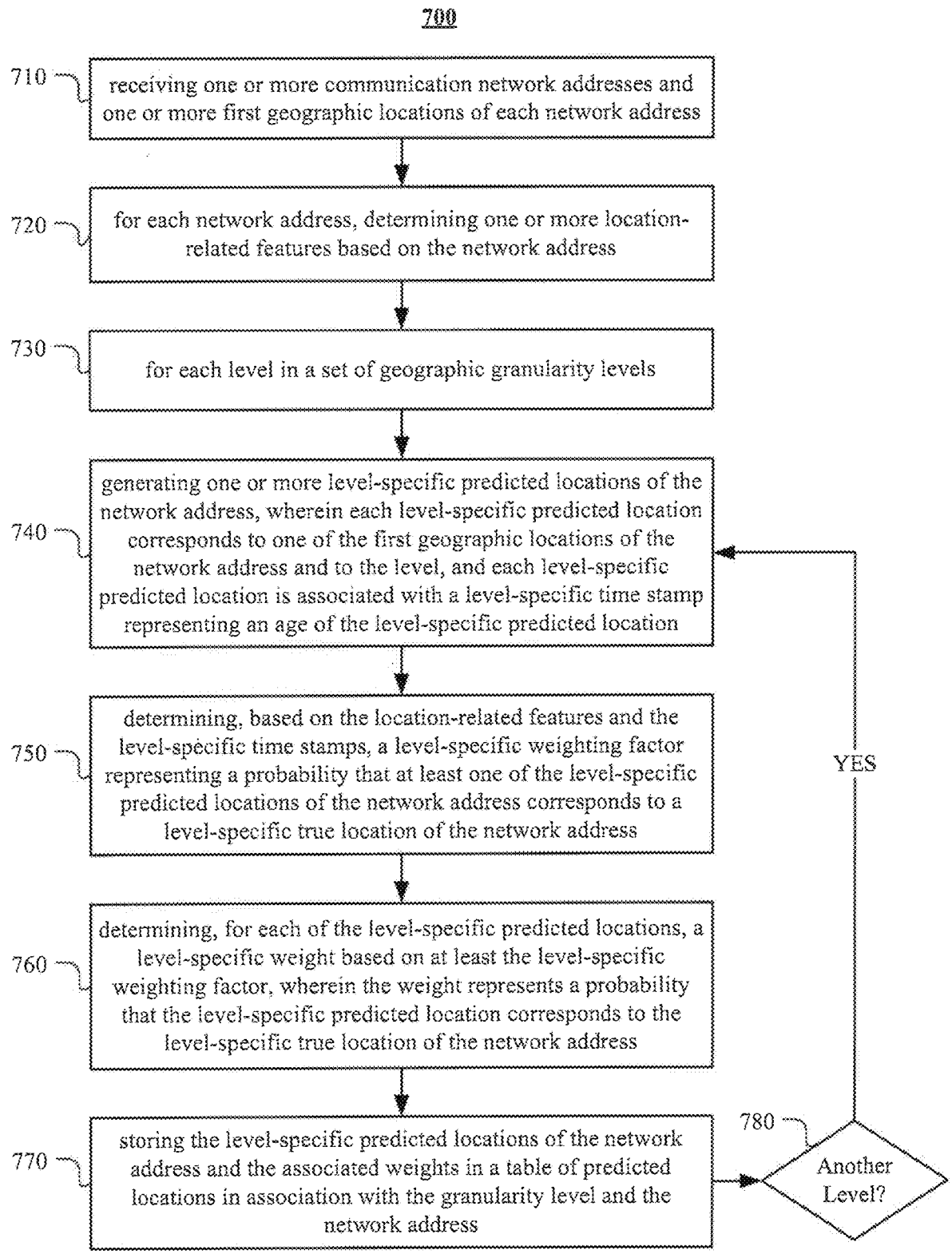
FIG. 7 illustrates an example method for predicting locations of client systems at multiple granularity levels.

FIG. 7 illustrates an example method 700 for predicting locations of client systems at multiple granularity levels. The method 700 is based on the method 300 for predicting locations of client systems, but may learn predicted locations at multiple granularity levels. The method 700 may begin at step 710 by receiving one or more communication network addresses and one or more first geographic locations of each network address. Step 720 may, for each network address, determine one or more location-related features based on the network address. Step 730 may begin a loop that repeats the following steps for each level in a set of geographic granularity levels. Step 740 may generate one or more level-specific predicted locations of the network address, wherein each level-specific predicted location corresponds to one of the first geographic locations of the network address and to the level, and each level-specific predicted location is associated with a level-specific time stamp representing an age of the level-specific predicted location. Step 750 may determine, based on the location-related features and the level-specific time stamps, a level-specific weighting factor representing a probability that at least one of the level-specific predicted locations of the network address corresponds to a level-specific true location of the network address. Step 760 may determine, for each of the level-specific predicted locations, a level-specific weight based on at least the level-specific weighting factor, wherein the weight represents a probability that the level-specific predicted location corresponds to the level-specific true location of the network address. Step 770 may store the level-specific predicted locations of the network address and the associated weights in a table of predicted locations in association with the granularity level and the network address. Step 780 may determine whether there is another unprocessed level and, if so, invoke step 740 to process the next unprocessed level.

In particular embodiments, a location-based service or application may request that a predicted location of a client system 130 be determined by sending or submitting a location query 140 to the location prediction system. The location query 140 may include the network address of the client system 130 and/or a user ID 144 identifying a user for whom a location is to be determined. If the location query 140 includes a network address 142, the query processor may search the prediction table 152 for an entry having a network address 154 that matches the queried network address 142. If the location query includes a user ID 144, the query processor 146 may identify a network address that corresponds to the client system 130 using a lookup table or other suitable association and search the prediction table 152 for an entry having the identified corresponding network address. Alternatively or additionally, if the location query 140 includes a user ID 144, the query processor 146 may search the prediction table for an entry having a user ID 186 that matches the user ID 144. If the query processor 146 finds a prediction table entry 153 having a matching network address 154 or user ID 186, then one or more of the location predictions 156 stored in or otherwise associated with the matching prediction table entry 153 may be sent in a query response 190 as predictions 192. The location predictions 156 may be filtered prior to being included in the query response 190. For example, if the location query 140 requested a single location prediction, then the predicted location 158 having the highest weight 158 of the location predictions 156 may be included in the query response 190. If the location query 140 does not specify how many predicted locations are to be returned, then one or more of the predicted locations may be included in the query response 190. The query response 190 may be sent to the requesting service or application, which may use the predicted location having the highest confidence value as the device's location, or may use the list of predicted locations and associated confidence values in any other suitable way.

In particular embodiments, a "long-tail" location histogram may be generated that includes many or all of the predicted locations and associated confidences, including those having low confidences. One example application is identification of malicious actors. Locations having low confidence values may be useful for identifying suspicious behavior, e.g., to warn users or other systems and prevent malicious attacks on the social-networking system from a user account. For example, if a user was last seen in the US 30 minutes ago, the likelihood that the user is now in another country is low. If the US location has a high confidence and the location in the other country 30 minutes later has a low confidence, then communication from the other country may be malicious. Location histograms may also be used when subsequent decisions are made based on many network addresses, since the location histograms may maintain data about the uncertainty of the estimates.

In particular embodiments, the veracity of the data tables may be affected by incorrect data received from malicious actors or other sources, so steps may be taken to reduce the influence of bad data. For example, the veracity of the data tables may be affected by who is sending data and the likelihood that information stored in the feedback table based on data from a particular user is corrupt. Incoming data may be throttled to reduce the influence of bad data on location predictions. The user who sends the data may be represented by an anonymized user ID column in the training data table and/or feedback table. The anonymized user ID may be useful for at least two reasons: (1) just because one person in the ground truth data set is accessing the social-networking system disproportionately, they should not have a disproportionate influence on subsequent predictions for other users, and (2) throttling the amount of information a particular user shares can prevent the user from overwhelming the system. For example, if there are 100 people using a given IP address, there may appear to be many people upon which to build an understanding of the IP address. However, one of those people may be providing more information than the other 99, e.g., because their device is sending a large amount of data, or as part of a malicious event. This problem may be addressed by rate-limiting the amount of information used from the user, e.g., by limiting the user to providing only one data point per hour, or per four hours, or to only providing a certain amount of information such that information from the user does not exceed 3 times the amount of information expected from an individual user. The user's data (e.g., signals) may be down-weighted per submission, or sampled, or otherwise aggregated.

Particular embodiments may repeat one or more steps of the methods of each of FIGS. 3-7, where appropriate. Although this disclosure describes and illustrates particular steps of the methods of FIGS. 3-7 as occurring in a particular order, this disclosure contemplates any suitable steps of the methods of FIGS. 3-7 occurring in any suitable order. Moreover, although this disclosure describes and illustrates an example method for improving search result rankings including the particular steps of the methods of FIGS. 3-7, this disclosure contemplates any suitable method for improving search result rankings including any suitable steps, which may include all, some, or none of the steps of the methods of FIGS. 3-7, where appropriate. Furthermore, although this disclosure describes and illustrates particular components, devices, or systems carrying out particular steps of the method of FIGS. 3-7, this disclosure contemplates any suitable combination of any suitable components, devices, or systems carrying out any suitable steps of the methods of FIGS. 3-7.

Figure 8:
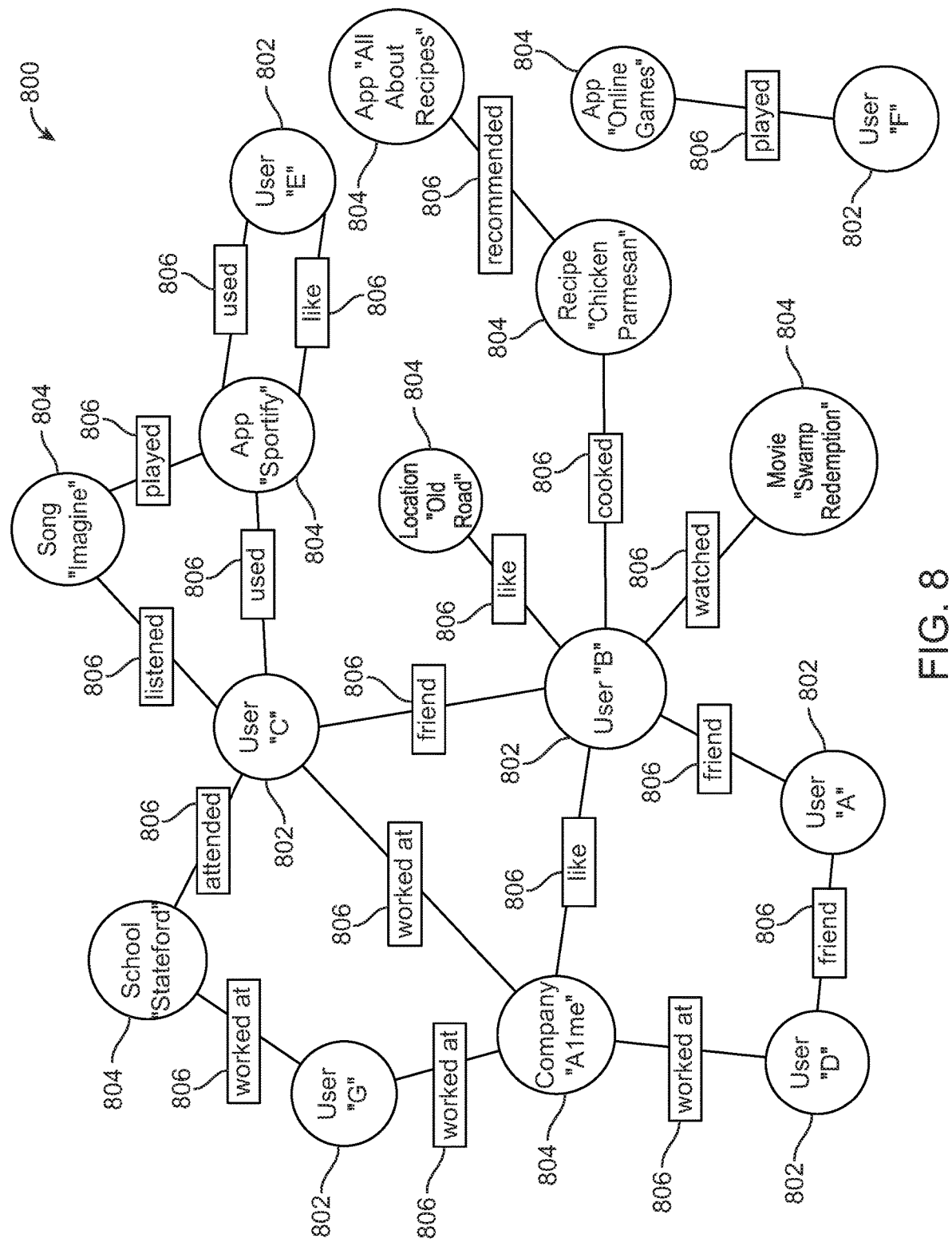
FIG. 8 illustrates an example social graph.

FIG. 8 illustrates example social graph 800. In particular embodiments, social-networking system 160 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social-networking system 160, client system 130, or third-party system 170 may access social graph 800 and related social-graph information for suitable applications. The nodes and edges of social graph 800 may be stored as data objects, for example, in a data store (such as a social-graph database). Such a data store may include one or more searchable or queryable indexes of nodes or edges of social graph 800.

In particular embodiments, a user node 802 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social-networking system 160. In particular embodiments, a user node 802 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 804 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social-networking system 160. Profile pages may also be hosted on third-party websites associated with a third-party system 170. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 806 connecting the first user's user node 802 to the second user's user node 802 in social graph 800 and store edge 806 as social-graph information in one or more data stores 164. In the example of FIG. 8, social graph 800 includes an edge 806 indicating a friend relation between user nodes 802 of user "A" and user "B" and an edge indicating a friend relation between user nodes 802 of user "C" and user "B."

Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 160 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social-networking system 160 may create a "played" edge 806 (as illustrated in FIG. 8) between concept nodes 804 corresponding to the song and the application to indicate that the particular song was played by the particular application. In this case, "played" edge 806 corresponds to an action performed by an external application on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804).

In particular embodiments, social-networking system 160 may create an edge 806 between a user node 802 and a concept node 804 in social graph 800. As an example and not by way of limitation, a user viewing a concept-profile page (such as, for example, by using a web browser or a special-purpose application hosted by the user's client system 130) may indicate that he or she likes the concept represented by the concept node 804 by clicking or selecting a "Like" icon, which may cause the user's client system 130 to send to social-networking system 160 a message indicating the user's liking of the concept associated with the concept-profile page. In response to the message, social-networking system 160 may create an edge 806 between user node 802 associated with the user and concept node 804, as illustrated by "like" edge 806 between the user and concept node 804. In particular embodiments, social-networking system 160 may store an edge 806 in one or more data stores. In particular embodiments, an edge 806 may be automatically formed by social-networking system 160 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 9:
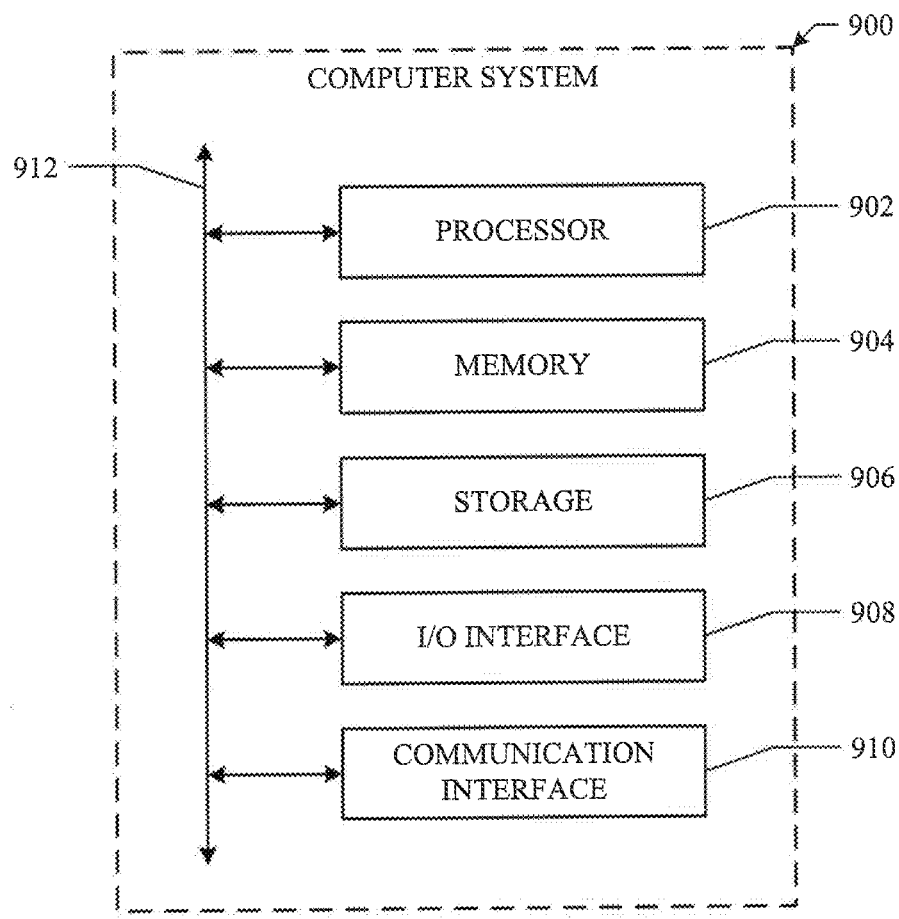
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
    by one or more computer systems, receiving one or more communication network addresses and one or more first geographic locations of each network address;
    by the one or more computer systems, for each network address, determining one or more location-related features based on the network address;
    by the one or more computer systems, generating one or more predicted locations of the network address, wherein each predicted location corresponds to one of the first geographic locations of the network address, and each predicted location is associated with a time stamp representing an age of the predicted location;
    by the one or more computer systems, determining, based on the location-related features and the time stamps, a weighting factor representing a probability that at least one of the predicted locations of the network address corresponds to a true location of the network address;
    by the one or more computer systems, determining, for each of the predicted locations, a weight based on at least the weighting factor, wherein the weight represents a probability that the predicted location corresponds to the true location of the network address;
    by the one or more computer systems, storing the predicted locations of the network address and the associated weights in a table of predicted locations in association with the network address; and
    by the one or more computer systems, providing, in response to a request to identify a geographic location for a particular network address, one or more of the predicted locations that correspond to the particular network address.

2. The method of claim 1, wherein a value of each weight corresponding to the predicted location is based on the weighting factor and a previous value of the weight.

3. The method of claim 2, wherein the value of the weight corresponding to the predicted location is based on a product of the weighting factor and the previous value of the weight.

4. The method of claim 1, further comprising:
    by the one or more computer systems, updating one or more of the predicted locations, wherein the updating comprises:
        determining an updated value of the weighting factor based on the ages of the predicted locations; and
        determining updated values of the weights based on the updated value of the weighting factor, wherein a sum of the updated values of the weights is less than 1.

5. The method of claim 4, wherein the updating one or more of the predicted locations is in response to an interval of time elapsing or receiving a location update.

6. The method of claim 1, wherein the plurality of predicted locations is associated with an other-location weight that represents a probability that the true location of the network address does not correspond to any of the predicted locations of the network address, and a sum of the weights of the predicted locations and the other-location weight is 1.

7. The method of claim 6, further comprising:
    by the one or more computer systems, determining the other-location weight based on a difference between 1 and the sum of the updated values of the weights of the predicted locations.

8. The method of claim 1, further comprising:
    by the one or more computer systems, receiving a location update comprising a second geographic location of the network address and a time stamp indicating an age of the second geographic location;
    by the one or more computer systems, determining whether the age of the second geographic location satisfies a recent age threshold; and
    by the one or more computer systems, when the age of the second geographic location satisfies the recent age threshold:
        determining an updated value of the weighting factor, wherein the updated value is a maximum weighting factor, and
        determining an updated value of the weight associated with the second geographic location based on the current value of the weight and the updated value of the weighting factor.

9. The method of claim 1, wherein the weighting factor is determined by a machine-learning model based on the location-related features.

10. The method of claim 9, wherein the location-related features comprise one or more of a country, a network protocol type, or a number of days at a current location.

11. The method of claim 9, wherein the location-related features comprise a true location of the network address and a predictions-includes-true indicator that indicates whether the predicted locations include the true location, the method further comprising:
    by the one or more computer systems, when the age of the second geographic location satisfies the recent age threshold:

setting the true location of the network address to correspond to the second geographic location; and
setting the prediction-includes-true-location indicator to true,
wherein the machine-learning model uses the predictions-include-true indicator as a feature in determining the weighting factor.

12. The method of claim 1, wherein the predicted location corresponds to the true location of the network address when the predicted location is less than a threshold distance from the true location.

13. The method of claim 1, wherein the predicted location corresponds to the true location of the network address when the predicted location is in a geographic sub-region associated with the true location, and the sub-region is in a geographic region associated with the network address.

14. The method of claim 1, wherein the predicted location of the network address comprises one or more of a country, a region of a country, a city, a zip code, a map tile, or a latitude, longitude pair.

15. The method of claim 1, wherein the network address comprises an Internet Protocol (IP) address.

16. The method of claim 1, further comprising:
by the one or more computer systems, receiving the request to identify a geographic location for a particular network address; and
by the one or more computer systems, identifying the one or more of the predicted locations that correspond to the particular network address, wherein the identifying comprises searching the table for a prediction table entry that comprises the particular network address, and retrieving the predicted locations from the prediction table entry,
wherein the providing one or more of the predicted locations that correspond to the particular network address comprises providing the weights associated with the provided predicted locations.

17. The method of claim 16, wherein each of one or more of the communication network addresses is associated with at least one broadened address that is based on the communication network address and corresponds to a plurality of network addresses that includes the communication network address, the method further comprising:
by the one or more computer systems, identifying one or more of the broadened addresses that correspond to the particular network address,
wherein the response comprises one or more of the predicted locations that correspond to the broadened address.

18. The method of claim 1, wherein each of the communication network addresses is associated with a plurality of granularity levels, and each granularity level comprises the following learning features:
one or more level-specific location predictions, wherein each level-specific location prediction includes a level-specific time stamp, a level-specific predicted location, and a level-specific weight,
a level-specific weighting factor, a level-specific true location, and
a level-specific predicted-includes-true indicator,
wherein, for each granularity level, the level-specific weighting factor of is determined based on the level-specific learning features, and the level-specific weights are determined based on the level-specific weighting factor.

19. One or more computer-readable non-transitory storage media embodying software that is operable when executed to:
receive one or more communication network addresses and one or more first geographic locations of each network address;
for each network address, determine one or more location-related features based on the network address;
generate one or more predicted locations of the network address, wherein each predicted location corresponds to one of the first geographic locations of the network address, and each predicted location is associated with a time stamp representing an age of the predicted location;
determine, based on the location-related features and the time stamps, a weighting factor representing a probability that at least one of the predicted locations of the network address corresponds to a true location of the network address;
determine, for each of the predicted locations, a weight based on at least the weighting factor, wherein the weight represents a probability that the predicted location corresponds to the true location of the network address;
store the predicted locations of the network address and the associated weights in a table of predicted locations in association with the network address; and
provide, in response to a request to identify a geographic location for a particular network address, one or more of the predicted locations that correspond to the particular network address.

20. A system comprising:
one or more processors; and
one or more computer-readable non-transitory storage media coupled to one or more of the processors and comprising instructions operable when executed by one or more of the processors to cause the system to:
receive one or more communication network addresses and one or more first geographic locations of each network address;
for each network address, determine one or more location-related features based on the network address;
generate one or more predicted locations of the network address, wherein each predicted location corresponds to one of the first geographic locations of the network address, and each predicted location is associated with a time stamp representing an age of the predicted location;
determine, based on the location-related features and the time stamps, a weighting factor representing a probability that at least one of the predicted locations of the network address corresponds to a true location of the network address;
determine, for each of the predicted locations, a weight based on at least the weighting factor, wherein the weight represents a probability that the predicted location corresponds to the true location of the network address;
store the predicted locations of the network address and the associated weights in a table of predicted locations in association with the network address; and
provide, in response to a request to identify a geographic location for a particular network address, one or more of the predicted locations that correspond to the particular network address.

* * * * *